(12) United States Patent
Itohara et al.

(10) Patent No.: US 11,082,250 B2
(45) Date of Patent: Aug. 3, 2021

(54) DISTRIBUTED COORDINATION SYSTEM, APPLIANCE BEHAVIOR MONITORING DEVICE, AND APPLIANCE

(71) Applicant: MITSUBISHI ELECTRIC CORPORATION, Tokyo (JP)

(72) Inventors: Tatsuhiko Itohara, Tokyo (JP); Tetsuro Shida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 69 days.

(21) Appl. No.: 16/468,195

(22) PCT Filed: Dec. 4, 2017

(86) PCT No.: PCT/JP2017/043385
§ 371 (c)(1),
(2) Date: Jun. 10, 2019

(87) PCT Pub. No.: WO2018/146923
PCT Pub. Date: Aug. 16, 2018

(65) Prior Publication Data
US 2020/0014551 A1      Jan. 9, 2020

(30) Foreign Application Priority Data
Feb. 7, 2017   (JP) .............................. JP2017-020066

(51) Int. Cl.
*H04L 12/28* (2006.01)

(52) U.S. Cl.
CPC ........ *H04L 12/2816* (2013.01); *H04L 12/281* (2013.01); *H04L 12/2814* (2013.01); *H04L 12/2838* (2013.01); *H04L 2012/2841* (2013.01)

(58) Field of Classification Search
CPC .............. H04L 12/2816; H04L 12/281; H04L 12/2814; H04L 12/2838; H04L 2012/2841
See application file for complete search history.

(56) References Cited

U.S. PATENT DOCUMENTS 8,869,154 B1 * 10/2014 Hillyard ................ G06F 9/4881
                                                               718/102
10,804,700 B2 * 10/2020 Cohen ....................... H02J 3/14
(Continued)

FOREIGN PATENT DOCUMENTS

| JP | 6-348712 A | 12/1994 |
| JP | 2004-252557 A | 9/2004 |
| JP | 2005-244577 A | 9/2005 |

*Primary Examiner* — Patrice L Winder
*Assistant Examiner* — Angela M Widhalm De Rodrig
(74) *Attorney, Agent, or Firm* — Birch, Stewart, Kolasch & Birch, LLP

(57) ABSTRACT

For each of a first appliance group of a plurality of appliances (110A, 110B, 110C) each having one or more function modules executed for providing a service, an execution plan for executing the one or more function modules from the present to the future is specified based on operation information. A single scenario is specified among a plurality of scenarios included in a service definition list, in such a way that the specified scenario does not hinder the execution plan. A second appliance group of a plurality of appliances (110A, 110B, 110C) each having some of the function modules that are indicated in the specified single scenario and executed for providing the service. Based on the specified single scenario, the second appliance group is made to execute the function modules indicated in the specified single scenario.

8 Claims, 18 Drawing Sheets

(56) References Cited

U.S. PATENT DOCUMENTS

| | | | | |
|---|---|---|---|---|
| 2003/0187769 A1* | 10/2003 | Muramatsu | G06Q 40/00 | 705/35 |
| 2004/0024483 A1* | 2/2004 | Holcombe | G06Q 30/02 | 700/122 |
| 2004/0136533 A1* | 7/2004 | Takagaki | H04L 9/0891 | 380/255 |
| 2004/0177017 A1* | 9/2004 | Yamamoto | G06Q 40/00 | 705/35 |
| 2005/0018611 A1* | 1/2005 | Chan | H04L 41/147 | 370/241 |
| 2007/0250446 A1* | 10/2007 | Zalewski | G06Q 30/04 | 705/52 |
| 2010/0043001 A1* | 2/2010 | Stolpe | G06F 9/4881 | 718/102 |
| 2010/0312600 A1* | 12/2010 | Motoyama | G06Q 10/04 | 705/7.35 |
| 2011/0144932 A1* | 6/2011 | Alles | G01D 4/002 | 702/61 |
| 2011/0149720 A1* | 6/2011 | Phuah | H04L 43/50 | 370/216 |
| 2011/0153246 A1* | 6/2011 | Donaldson | G01R 21/1331 | 702/65 |
| 2012/0158827 A1* | 6/2012 | Mathews | H04L 12/6418 | 709/203 |
| 2012/0278459 A1* | 11/2012 | VerSteeg | H04L 69/163 | 709/223 |
| 2012/0323388 A1* | 12/2012 | Littrell | H02J 13/00034 | 700/292 |
| 2013/0096726 A1* | 4/2013 | Lyren | G05B 13/026 | 700/291 |
| 2014/0289388 A1* | 9/2014 | Ghosh | H04L 12/2834 | 709/223 |
| 2015/0156031 A1* | 6/2015 | Fadell | G08B 19/005 | 700/276 |
| 2015/0338869 A1* | 11/2015 | Behrangrad | G05B 15/02 | 700/291 |
| 2015/0379993 A1* | 12/2015 | Subhojit | G10L 15/06 | 704/275 |
| 2016/0070617 A1* | 3/2016 | Algie | G06F 11/1076 | 714/766 |
| 2016/0135077 A1* | 5/2016 | Streijl | H04L 47/127 | 370/230 |
| 2017/0005515 A1* | 1/2017 | Sanders | H02J 3/14 | |
| 2017/0006135 A1* | 1/2017 | Siebel | H04L 69/40 | |
| 2017/0109037 A1* | 4/2017 | Seo | G06F 3/0482 | |
| 2018/0001184 A1* | 1/2018 | Tran | G06F 1/163 | |
| 2018/0032399 A1* | 2/2018 | Johnson | G06F 11/2033 | |
| 2018/0062919 A1* | 3/2018 | Justin | H04L 43/087 | |
| 2018/0087795 A1* | 3/2018 | Okita | G05B 19/042 | |
| 2019/0082415 A1* | 3/2019 | Karlsson | H04W 64/00 | |

* cited by examiner

FIG. 4

APPLIANCE (TELEVISION SET) 112-1

| FUNCTION MODULE | OPERATION COST | REQUIRED TIME |
|---|---|---|
| BROADCAST WAVE RECEIVING PART | 20 | DEPENDENT ON OPERATION |
| BROADCAST WAVE DECODING PART | 20 | DEPENDENT ON OPERATION |
| NETWORK IMAGE OBTAINING PART | 20 | DEPENDENT ON OPERATION |
| IMAGE DISPLAY PART | 20 | DEPENDENT ON OPERATION |
| IMAGE RECORDING PART | 20 | DEPENDENT ON OPERATION |
| REMOTE CONTROL OPERATION RECEIVING PART | 5 | 10msec |
| FUNCTION MODULE OPERATING STATE OBTAINING PART | 5 | 20msec |
| IMAGE ROTATION TRANSFORMING PART | 10 | 200msec |
| IMAGE EDITING PART | 10 | 200msec |
| IMAGE DISPLAY PART | 10 | 10msec |

FIG. 5

APPLIANCE (AIR CONDITIONER) 112-2

| FUNCTION MODULE | OPERATION COST | REQUIRED TIME |
|---|---|---|
| COOLING/HERTING STARTING PART | 5 | 1msec |
| ROOM TEMPERATURE DETECTION PART | 5 | 10msec |
| SET-VALUE CHANGING PART | 5 | 10msec |
| INFRARED IMAGE OBTAINING PART | 15 | 1msec |
| VISIBLE IMAGE OBTAINING PART | 15 | 1msec |
| INFRARED/VISIBLE IMAGE SENDING PART | 20 | 1msec |
| ROOM TEMPERATURE DATA SENDING PART | 10 | 10msec |
| ROOM TEMPERATURE GRAPH GENERATION PART | 20 | 1.5msec |
| ROOM TEMPERATURE GRAPH SENDING PART | 20 | 2sec |
| IMAGE SENDING PART | 20 | 3sec |
| INFRARED IMAGE AND VISIBLE IMAGE SYNTHESIZING PART | 20 | 5sec |

REFRIGERATOR

| FUNCTION MODULE | OPERATION COST | REQUIRED TIME |
|---|---|---|
| INSIDE IMAGE RECOGNITION PART | 75 | Ta |
| RECIPE OFFERING PART | 20 | Tb |
| RECIPE INFORMATION RECEIVING PART | 10 | Tc |
| INSIDE IMAGE TAKING/CORRECTING PART | 40 | Td |
| INSIDE IMAGE SENDING PART | 15 | Te |
| INSIDE LIST RECEIVING PART | 10 | Tf |

TELEVISION SET

| FUNCTION MODULE | OPERATION COST | REQUIRED TIME |
|---|---|---|
| VIEWED PROGRAM INFORMATION EXTRACTION PART | 15 | Tg |
| INSIDE IMAGE RECOGNITION PART | 35 | Th |
| RECIPE OFFERING PART | 10 | Ti |
| INSIDE LIST SENDING PART | 10 | Tj |

SMARTPHONE

| FUNCTION MODULE | OPERATION COST | REQUIRED TIME |
|---|---|---|
| RECIPE RECOMMENDATION EXECUTING PART | 10 | Tk |
| DISPLAY PART | 10 | Tl |

| TELEVISION SET | | |
|---|---|---|
| FUNCTION MODULE | OPERATION COST | REQUIRED TIME |
| BROADCAST RECEIVING PART | 10 | Tm |
| BROADCAST RECORDING PART | 25 | Tn |
| PHOTOGRAPH RECEIVING PART | 10 | To |
| PHOTOGRAPH EDITING PART | 30 | Tp |
| DISPLAY PART | 10 | Tq |
| PHOTOGRAPH SENDING PART | 10 | Tr |
| BRORDCAST REQUEST SENDING PART | 5 | Ts |

DISTRIBUTED COORDINATION SYSTEM, APPLIANCE BEHAVIOR MONITORING DEVICE, AND APPLIANCE

TECHNICAL FIELD

The present invention relates to a distributed coordination system, an appliance behavior monitoring device, and an appliance.

BACKGROUND ART

Recently, as Information Technology (IT) develops, performances of a Central Processing Unit (CPU) and a communication function of an appliance are being enhanced. Further, there is a tendency to introduce an appliance cooperation system in which appliances sends and receives data held by themselves to and from each other, and a system controller installed in a room provides a service.

Further, it is highly hoped to provide a distributed appliance coordination system that has not a device such as a system controller for providing a service as a central device of the system and implements such a service as provided by a system controller by cooperation of function modules held by a plurality of appliances.

For example, Patent Reference 1 discloses a coordinate distributed system that executes a coordinate distributed service that is implemented by combining function modules held by information processing devices connected via a network. The coordinate distributed system described in the Patent Reference 1 is characterized in that the function modules embedded in a plurality of information processing devices are dynamically selected and combined.

PRIOR ART REFERENCE

Patent Reference

Patent Reference 1: Japanese Patent Application Publication No. 2004-252557 (Page 11, FIG. 2)

SUMMARY OF THE INVENTION

Problem to be Solved by the Invention

However, the coordinate distributed system described in the Patent Reference 1 has a problem of occurrence of a case in which an information processing device cannot execute its own function or it is necessary to reconstruct the distribution in order to stop execution of the function module, when the information processing device needs to perform its own function while its function module required for a service of the coordinate distributed system is under execution.

Thus, an object of the present invention is to provide a coordinate distributed system that can select function modules of suitable appliances under conditions that the its own operation of each appliance is given priority, so that a service can be executed smoothly.

Means of Solving the Problem

One mode of the present invention provides a distributed coordination system to provide a service, the distributed coordination system including a first appliance group of a plurality of appliances, the distributed coordination system comprising: an appliance information list storage part to store an appliance information list indicating one or more function modules held by each appliance included in the first appliance group and required time for executing each function module of the one or more function modules; a service definition list storage part to store a service definition list indicating a plurality of scenarios each of which indicates a plurality of function modules to be executed for providing the service and an execution order of the function modules; an operation storage part to store present operating state information, future operation schedule information, and an operation history, the present operating state information indicating a function module currently under execution by each appliance included in the first appliance group among the one or more function modules, the future operation schedule information indicating a schedule of function modules to be executed in the future by each appliance included in the first appliance group among the one or more function modules, the operation history indicating a history of function modules executed in the past by each appliance included in the first appliance group among the one or more function modules; a future operation estimation part to generate, based on the operation history, operation prediction information indicating an occurrence probability of an operation to be executed in the future by each of the one or more function modules held by each appliance included in the first appliance group; a function module selection part to specify a plurality of appliances each of which has at least any one of the function modules among the first appliance group, based on the service definition list, to specify, for each of the specified appliances, an execution plan for executing from the present to the future the one or more function modules held by each of the specified appliances, based on the present operating state information, the future operation schedule information, and the operation prediction information, to specify a single scenario among the scenarios so as not to hinder the execution plan, to specify a second appliance group of a plurality of appliances out of the first appliance group so as not to hinder the execution plan, each of the appliances included in the second appliance group having at least any one of the function modules indicated in the single scenario; and a service control part to make, based on the single scenario, the second appliance group execute the function modules indicated in the single scenario.

One mode of the present invention provides an appliance behavior monitoring device in a distributed coordination system to provide a service, the distributed coordination system including a first appliance group of a plurality of appliances and the appliance behavior monitoring device, the appliance behavior monitoring device comprising: an appliance information list storage part to store an appliance information list that includes information on one or more function modules held by each appliance included in the first appliance group and on required time for executing each function module of the one or more function modules; an operation storage part to store present operating state information, future operation schedule information, and an operation history, the present operating state information, the future operation schedule information, and an operation history being outputted from each appliance included in the first appliance group, the present operating state information indicating a function module currently under execution among the one or more function modules, the future operation schedule information indicating a schedule of function modules to be executed in the future among the one or more function modules, the operation history indicating a history of function modules executed in the past among the one or more function modules; a future operation estimation part to generate, based on the operation history, operation prediction information indicating an occurrence probability of an operation to be executed in the future by each of the one or more function modules held by each appliance included in the first appliance group; and a function module selection part to obtain, from a single appliance included in the first appliance group, a service definition list indicating a plurality of scenarios each of which indicates a plurality of function modules executed for providing the service and an execution order of the function modules, to specify, based on the service definition list, a plurality of appliances each of which has at least any one of the function modules among the first appliance group, to specify, for each of the specified appliances, an execution plan for executing from the present to the future the one or more function modules held by each of the specified appliances, based on the present operating state information, the future operation schedule information, and the operation prediction information, to specify a single scenario among the scenarios, so as not to hinder the execution plan, to specify a second appliance group of a plurality of appliances each of which has at least any one of the function modules indicated in the single scenario out of the first appliance group, so as not to hinder the execution plan, and to make the single appliance control the second appliance group to execute the function modules indicated in the single scenario.

One mode of the present invention provides an appliance having one or more function modules, the appliance being included in a plurality of appliances in a distributed coordination system to provide a service, the distributed coordination system including a first appliance group of the appliances and an appliance behavior monitoring device, the appliance comprising: a service definition list storage part to store a service definition list indicating a plurality of scenarios each of which indicates a plurality of function modules to be executed for providing the service and an execution order of the function modules; a service control part; and a communication part to output present operating state information, future operation schedule information, and an operation history to the appliance behavior monitoring device, the present operating state information indicating a function module currently under execution among the one or more function modules, the future operation schedule information indicating a schedule of function modules to be executed in the future among the one or more function modules, the operation history indicating a history of function modules executed in the past among the one or more function modules; wherein: the communication part receives, from one of the first appliance group and the appliance behavior monitoring device, information indicating a single scenario specified from the scenarios and a second appliance group of a plurality of appliances each of which has at least any one of the function modules indicated in the single scenario among the first appliance group; and the service control part, based on the single scenario, makes the second appliance group execute the function modules indicated in the single scenario.

Effects of the Invention

According to one mode of the present invention, it is possible to provide a coordinate distributed system that can select function modules of suitable appliances under conditions that the its own operation of each appliance is given priority and as a result can execute a service smoothly.

BRIEF DESCRIPTION OF THE DRAWINGS

FIG. 4 is a schematic diagram showing an example of an appliance information list in the case where the appliance in the embodiment 1 is a television set;

FIG. 5 is a schematic diagram showing an example of the appliance information list in the case where the appliance in the embodiment 1 is an air conditioner;

FIG. 14 is a schematic diagram showing an appliance information list of the refrigerator in the example 1 of the embodiment 1;

FIG. 15 is a schematic diagram showing an appliance information list of the television set in the example 1 of the embodiment 1;

FIG. 16 is a schematic diagram showing an appliance information list of the smartphone in the example 1 of the embodiment 1;

FIG. 17 is a schematic diagram showing a first example of time fluctuation of operation cost in the example 1 of the embodiment 1;

MODE FOR CARRYING OUT THE INVENTION

Embodiment 1

Figure 1:
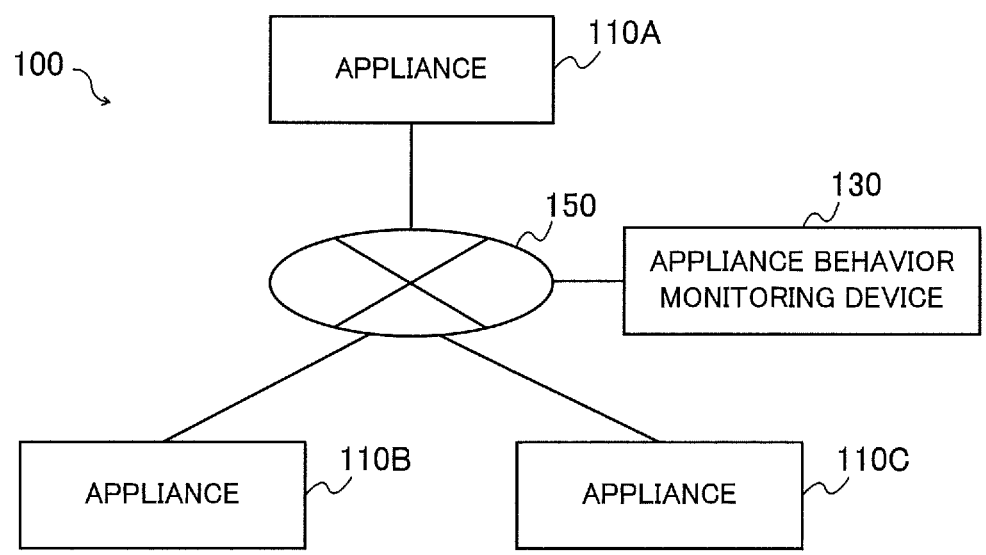
FIG. 1 is a schematic diagram showing a configuration of a distributed coordination system according to an embodiment 1.

FIG. 1 is a schematic diagram showing a configuration of a distributed coordination system 100 according to an embodiment 1.

The distributed coordination system 100 includes a plurality of appliances 110A, 110B, and 110C and an appliance behavior monitoring device 130.

The appliances 110A, 110B, and 110C and the appliance behavior monitoring device 130 are connected to the Internet 150 as a network.

Although the three appliances 110A, 110B, and 110C are shown in FIG. 1, the number of the appliances is not limited to three. Further, when it is not necessary to distinguish each of the appliances 110A, 110B, and 110C, it is referred to as an appliance 110.

The distributed coordination system 100 has a plurality of appliances 110 and provides services. Here, the plurality of appliances 110 included in the distributed coordination system 100 are also referred to as a first appliance group.

A communication system employed in the Internet 150 may be wired or wireless. In the case where the communication system is wireless, a Wireless Fidelity (Wi-Fi, registered trademark) system, a Bluetooth (registered trademark) system, a Wireless Smart Utility Network (Wi-SUN, registered trade mark) system, or the like may be used, for example.

The appliance behavior monitoring device 130 may be located at any place as far as the appliances 110 can access it via the Internet 150, and can be provided as a computing system such as a cloud. Further, the appliance behavior monitoring device 130 may be implemented as one function of any appliance 110, for example the appliance 110A, included in the distributed coordination system 100.

Figure 2:
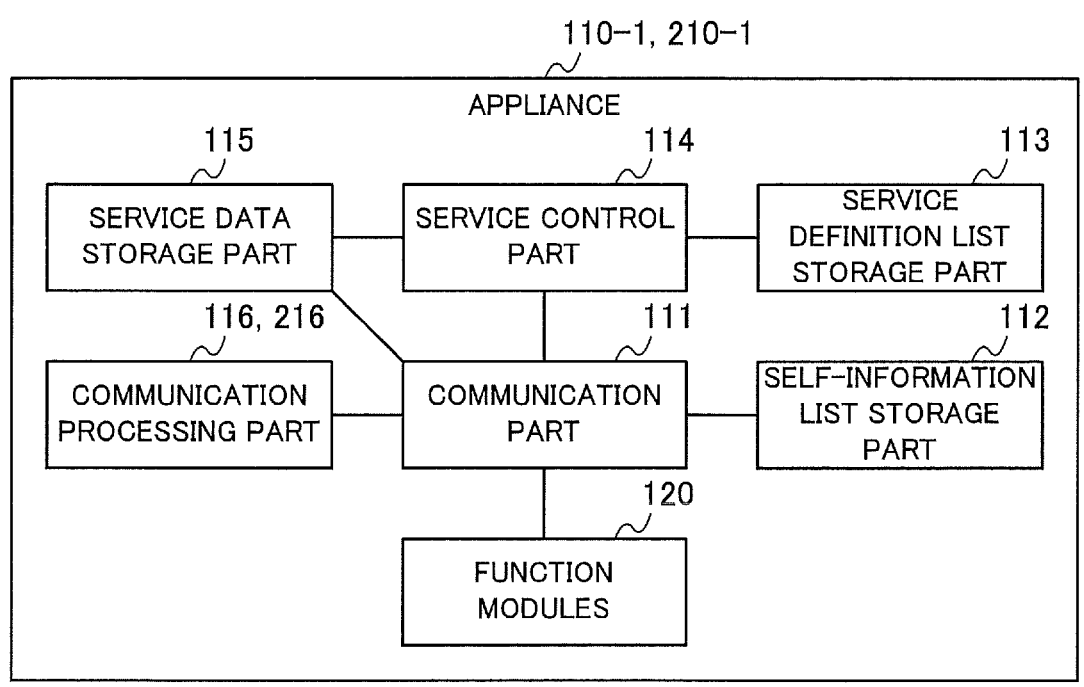
FIG. 2 is a block diagram showing schematically a first example of a configuration of an appliance in embodiments 1 and 2.

FIG. 2 is a block diagram showing schematically a first example of a configuration of an appliance 110.

The appliance 110-1 shown in FIG. 2 includes a communication part 111, a self-information list storage part 112, a service definition list storage part 113, a service control part 114, a service data storage part 115, a communication processing part 116, and function modules 120.

Figure 3:
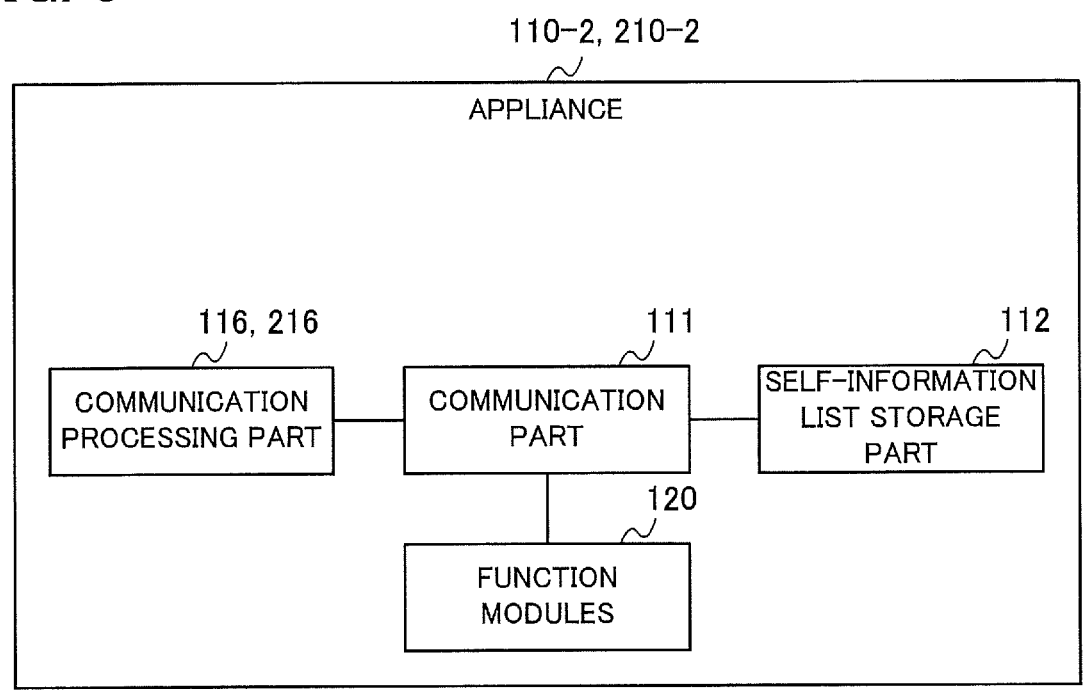
FIG. 3 is a block diagram showing schematically a second example of a configuration of an appliance in the embodiments 1 and 2.

FIG. 3 is a block diagram showing schematically a second example of a configuration of an appliance 110.

The appliance 110-2 shown in FIG. 3 includes a communication part 111, a self-information list storage part 112, a communication processing part 116, and function modules 120.

Among the parts shown in FIG. 3, parts similar to ones shown in FIG. 2 are given the same reference numbers, respectively.

The distributed coordination system 100 may include an appliance 110-2 that has no function related to the services as shown in FIG. 3. However, the distributed coordination system 100 should include at least one appliance 110-1 that has a function related to the services as shown in FIG. 2.

Here, each of the services means that the plurality of appliances 110 operate in coordination with one another so as to cause effects on a user of the appliances 110.

The communication part 111 has a function to connect with the Internet 150. For example, the communication part 111 communicates with another appliance 110 or the appliance behavior monitoring device 130.

The self-information list storage part 112 stores appliance information list that indicates a function module 120 of its own appliance 110, an operation cost defined as a utilization rate of CPU or memory of the appliance 110 when the function module 120 of the appliance 110 is operated; and required time that is time required for operation of the function module 120 of the appliance 110. The appliance information list may contain information concerning the application performance including information on the CPU, the memory, and the number of cores of its own appliance 110.

FIG. 4 is a schematic diagram showing an example of the appliance information list in the case where the appliance 110 is a television set.

As shown in FIG. 4, the appliance information list 112-1 includes the names of the function modules 120, the operation costs, and the required time.

In FIG. 4, in the case where required time is dependent on operation, the time is determined depending on the operation. For example, the time is "video recording time" that can be obtained from a scheduled operation time in the future. Specifically, the required time for video recording reservation of a two-hour program is 2 hours.

FIG. 5 is a schematic diagram showing an example of appliance information list in the case where the appliance 110 is an air conditioner.

As shown in FIG. 5, the appliance information list 112-2 also includes the names of the function modules 120, the operation costs, and the required time.

Here, as the calculation of the operation costs, it is possible to use the maximum value of the utilization rate of the CPU or the utilization rate of the memory, or the larger value of the two. Further, the self-information list storage part 112 may have two or more values for each function module 120.

In the example of the present embodiment, it assumed that the operation cost must not exceed 100. In the case where a plurality of values are defined as operation costs, it is assumed that the sum of the operation costs based on the value of each operation cost must not exceed 100.

The service definition list storage part 113 stores a service definition list that indicates a scenario indicating a name of a service of its own appliance 110, a plurality of function modules 120 executed for providing the service of the appliance 110, and an execution order of the plurality of function modules 120.

Figure 6:
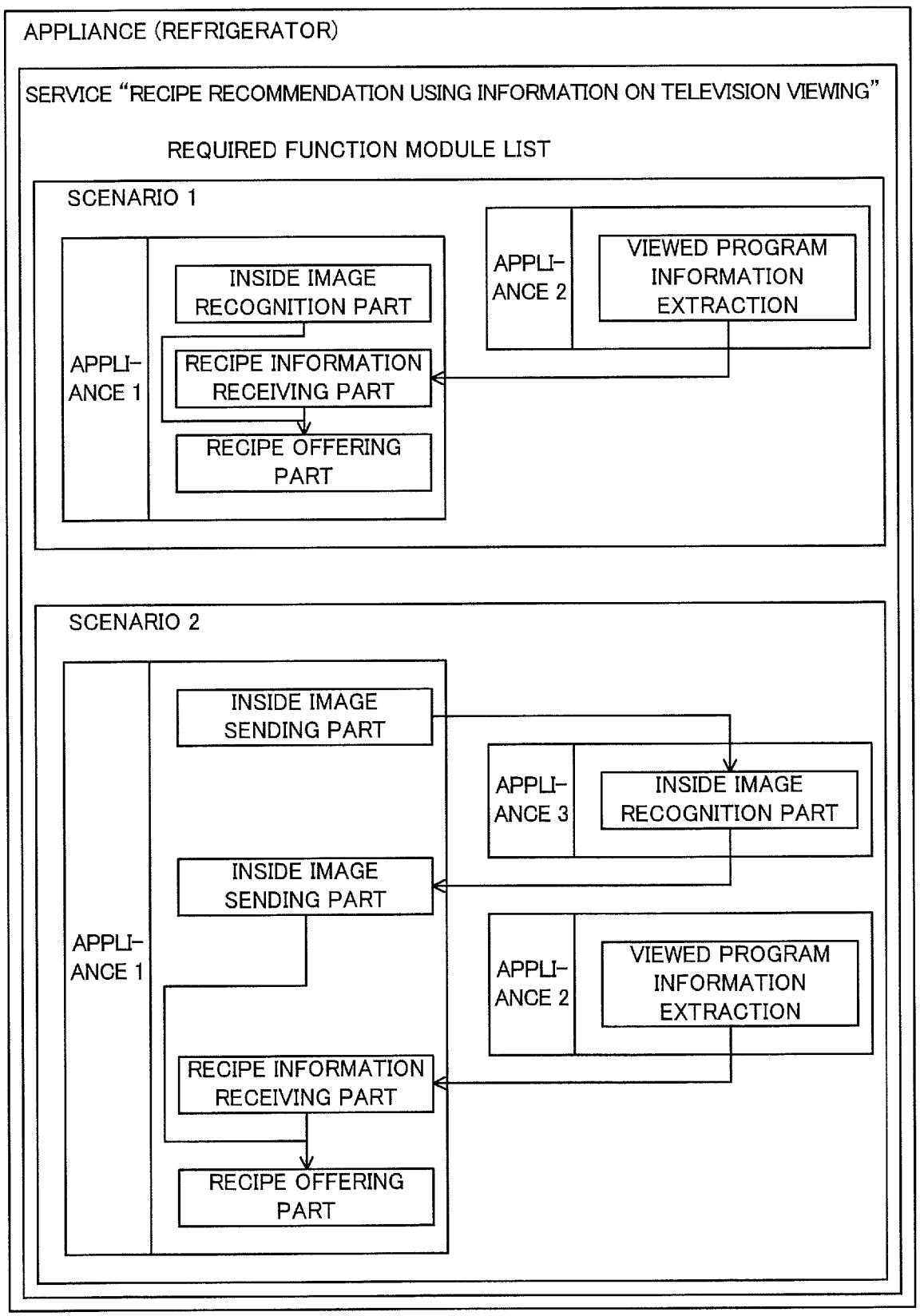
FIG. 6 is a schematic diagram showing an example of a service definition list in the case where the appliance in the embodiment 1 is a refrigerator.

FIG. 6 is a schematic diagram showing an example of service definition list in the case where the appliance 110 is a refrigerator.

The service definition list 113-1 shown in FIG. 6 defines function modules 120 required for providing a service of "recipe recommendation using information on television viewing" and coordination of appliances 110 having the function modules 120, for each scenario for providing the service.

The function modules 120 required for the service may be function modules 120 held by its own appliance 110 or function modules 120 that are expected to be held by other appliances 110 included in the distributed coordination system 100.

Figure 7:
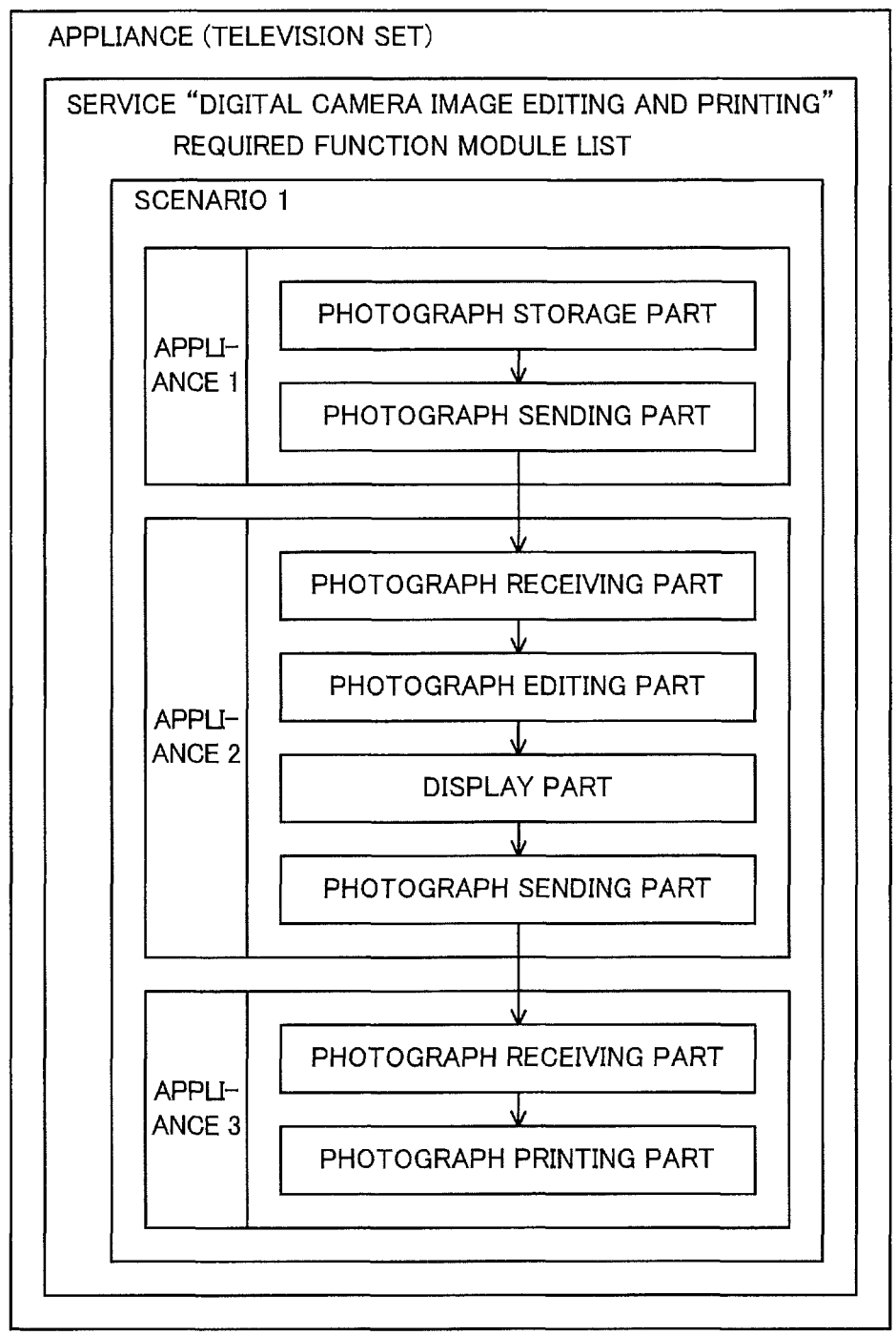
FIG. 7 is a schematic diagram showing an example of the service definition list in the case where the appliance in the embodiment 1 is a television set.

FIG. 7 is a schematic diagram showing an example of the service definition list in the case where the appliance 110 is a television set.

The service definition list 113-2 shown in FIG. 7 defines function modules 120 required for providing a service of "digital camera image editing and printing" and coordination of appliances 110 having the function modules 120, for each scenario for providing the service.

The service control part 114 activates a service of its own appliance 110 when a user of the distributed coordination system 100 or an appliance 110 included in the distributed coordination system 100 calls the service.

After the activation of the service, the service control part 114 searches for appliances 110 that have the function modules 120 required for the activated service, based on the service definition list stored in the service definition list storage part 113 of its own appliance 110, through the communication part 111. For example, the service control part 114 provides the appliance behavior monitoring device 130 with the service definition list of the activated service, in order to obtain information that indicates the scenario employed in the activated service and the appliances 110 to execute the function modules 120 in the scenario.

Here, it is assumed that, in the case where there are a plurality of appliances 110 that can execute a function module 120, the information obtained from the appliance behavior monitoring device 130 includes an execution priority of executing the function module 120 in each of the plurality of appliances 110.

Then, according to the scenario indicated in the obtained information, the service control part 114 executes the function modules 120 of the appliances 110 indicated in the obtained information. The service control part 114 selects an appliance 110 to execute a function module 120 according to the execution priorities included in the obtained information in the case where a plurality of appliances 110 are indicated in the obtained information. For example, in the case where a function module 120 is executed according to the execution priorities and as a result an error or the like occurs and necessary output data cannot be obtained, the service control part 114 selects an appliance 110 having the next execution priority, and makes the selected appliance 110 execute the function module 120.

Further, the service control part 114 sends, as input data, data stored in the service data storage part 115 to each function module 120 via the communication part 111, and stores output data received by the communication part 111 from each function module 120 into the service data storage part 115.

The service data storage part 115 stores output data of a service activated by the service control part 114 and output data of the function modules 120. For example, in the case where the output of the activated service is numerical data or a graph, the service data storage part 115 stores the data to be displayed by an appliance 110 having a display part as a function module 120. Further, for example, in the case where output of the activated service is a command of executing the operation of a function module of an appliance 110, the service data storage part 115 stores data for executing the function module 120 of the designated appliance 110.

The communication processing part 116 sends appliance information list stored in the self-information list storage part 112 to the appliance behavior monitoring device 130 via the communication part 111, when connection to the Internet 150 is started.

Further, the communication processing part 116 receives an obtaining request for a present operating state from the appliance behavior monitoring device 130 via the communication part 111, and, in response to the request, sends operating state information that indicates the present operating state of its own appliance 110 to the appliance behavior monitoring device 130 via the communication part 111.

Further, the communication processing part 116 receives an obtaining request for a future operation schedule from the appliance behavior monitoring device 130 via the communication part 111, and, in response to the request, sends future operation schedule information that indicates the future operation schedule of its own appliance 110 to the appliance behavior monitoring device 130 via the communication part 111.

Each function module 120 is a module that fulfills a function of its own appliance 110, and there is at least one function module 120 in the appliance 110.

Further, when the appliance 110 executes a service in the distributed coordination system 100, each function module 120 is activated, which is triggered by an instruction from the service control part 114 of an appliance 110 having the service. At that time, the function module 120 receives input data for the module from the service control part 114 of the appliance 110 having the service, and sends output data of the module to the appliance 110. Here, the function module 120 may receive input data for the module from a function module 120 of an appliance 110 (referred to as a second appliance 110) that was activated at the last time by the service control part 114 of the appliance 110 having the service, and send output data of the module to a function module 120 of an appliance 110 (referred to as a third appliance 110) that is to be activated subsequently by the service control part 114 of its own appliance 110. At that time, the appliance 110 having the service, the second appliance 110, its own appliance 110, and the third appliance 110 may be the same appliance 110, or different appliances 110.

Figure 8:
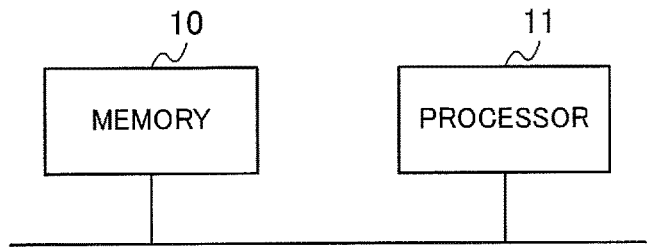
FIGS. 8(A) and 8(B) are schematic diagrams showing examples of a hardware configuration.
Figure 8:
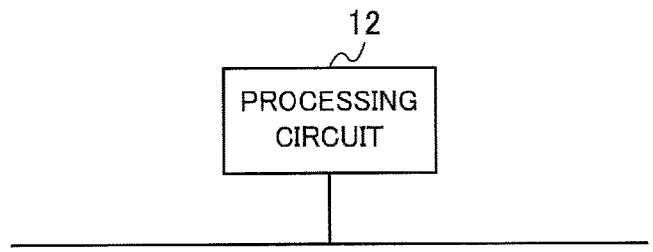

The above-described service control part 114 and some or all of the function modules 120 can be each implemented, for example, by a memory 10 and a processor 11, such as a Central Processing Unit (CPU), that executes a program stored in the memory 10, as shown in FIG. 8(A). Such a program can be provided through a network or being recorded in a storage medium.

Further, the self-information list storage part 112, the service definition list storage part 113, and the service data storage part 115 described above can be each implemented by the memory 10.

Further, the communication part 111 can be implemented by a communication device such as a Network Interface Card (NIC).

The service control part 114 and some or all of the function modules 120 can be each implemented, for example, by a processing circuit 12 such as a single circuit, a composite circuit, a programmed processor, parallel-programmed processors, an Application Specific Integrated Circuits (ASIC), or a Field Programmable Gate Array (FPGA), as shown in FIG. 8(B).

Next, the appliance behavior monitoring device 130 will be described.

The appliance behavior monitoring device 130 collects operation information of the appliances 110, and estimates execution plans. Operation information contains three pieces of information: a present operating state, a future operation schedule, and a future operation prediction. An execution plan is a plan for executing function modules 120 in operations executed by an appliance 110 for itself or being required by a service.

As an example of a communication protocol used in monitoring which function each appliance 110 is executing, it is possible to mention ECHONET Lite (registered trademark), although another protocol can be used.

The present operating state indicates an operating state of each function module 120 of each appliance 110 of the distributed coordination system 100 at the present time. In particular, an operating state of the function modules 120 indicates whether each function module 120 is in execution or not, and can include a utilization rate of the CPU, a utilization rate of the memory, or communication traffic of each function module 120 in execution.

The future operation schedule indicates an operation schedule of the function modules 120 after the present time, including a timer reservation operation of each appliance 110 of the distributed coordination system 100. In particular, the operation schedule of the function modules 120 indicates a schedule of function modules 120 that are executed in the future, and includes the time when the function modules 120 are executed.

The future operation prediction represents a result of prediction of operations after the present time for each appliance 110 of the distributed coordination system 100. As a method of prediction of operation of each function module 120, it is possible to suppose a method using a machine learning device into which information on each appliance 110 that has accumulated the "present operating states" and the "future operation schedules" as a operation history in the past is inputted, although another method can be used for prediction. Further, in the case where a machine learning device is used, it is possible to consider using a method such as Support Vector Machine, Hidden Markov Model, or Deep Learning, although another learning device can be used. Further, it is desired that information obtained as a future operation prediction includes all of name of appliance; and occurrence conditions, cycle length (frequency), time, operation mode (function), duration, and occurrence probability (possibility) of an operation to be executed by each function module 120 in the future. For example, a future operation prediction is preferably such information as: "on weekdays," the probability of operating "washing machine" "in one rinse mode" "at 7 a.m." "for 40 minutes" "everyday" is "40%" and the probability of "viewing television program" "on television set" "unconditionally" "for two hours" "from 7 p.m." "every Tuesday" is "75%".

Figure 9:
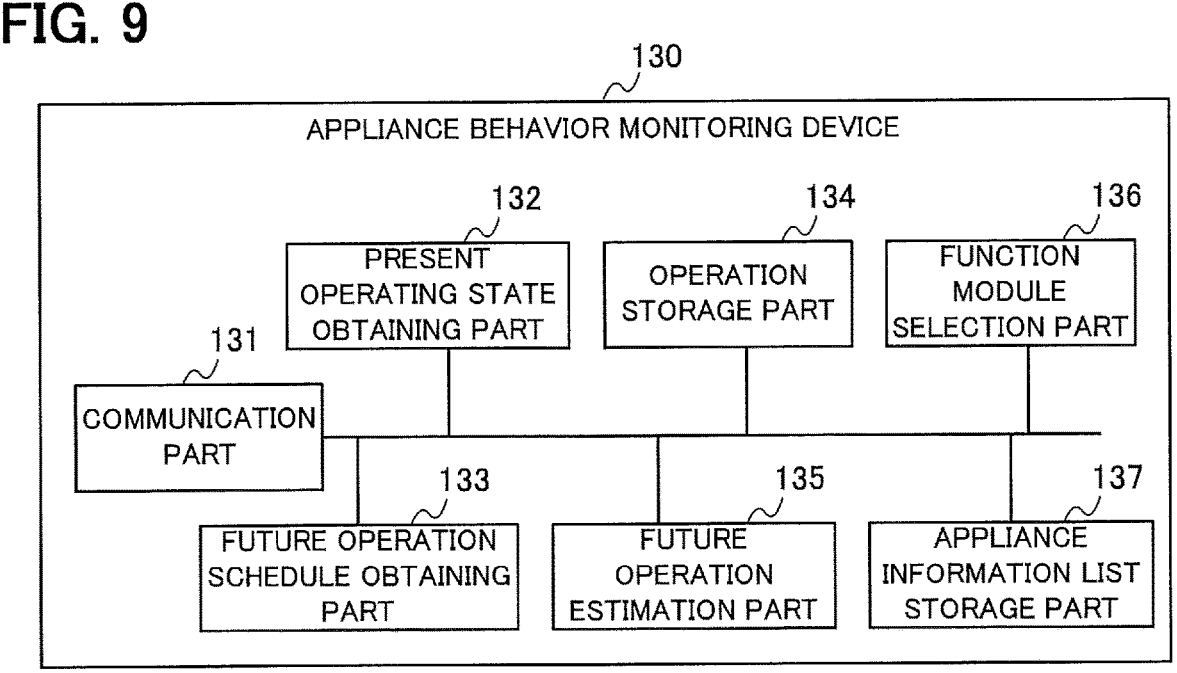
FIG. 9 is a schematic diagram showing a configuration of an appliance behavior monitoring device in the embodiment 1.

FIG. 9 is a schematic diagram showing a configuration of the appliance behavior monitoring device 130 in the embodiment 1.

The appliance behavior monitoring device 130 includes a communication part 131, a present operating state obtaining part 132, a future operation schedule obtaining part 133, an operation storage part 134, a future operation estimation part 135, a function module selection part 136, and an appliance information list storage part 137.

The communication part 131 has a function to connect with the Internet 150. For example, the communication part 131 communicates with an appliance 110.

The present operating state obtaining part 132 has a function to collect present operating state information, which indicates a present operating state of each appliance 110, at regular time intervals via the communication part 131 and a function to store the collected information into the operation storage part 134.

The future operation schedule obtaining part 133 has a function to collect future operation schedule information, which indicates a future operation schedule of each appliance 110, at regular time intervals via the communication part 131, and a function to store the collected information into the operation storage part 134.

The operation storage part 134 stores, as operation information, the present operating state information obtained by the present operating state obtaining part 132, the future operation schedule information obtained by the future operation schedule obtaining part 133, and operation prediction information estimated by the future operation estimation part 135.

Further, in response to a request from the future operation estimation part 135, the operation storage part 134 gives the present operating state information obtained by the present operating state obtaining part 132 and the future operation schedule information obtained by the future operation schedule obtaining part 133 to the future operation estimation part 135.

The present operating state information and the future operation schedule information are stored in the operation storage part 134 after execution of the corresponding function modules 120, as an operation history indicating a history of the function modules executed in the past.

The future operation estimation part 135 estimates future operation prediction by receiving input of the present operating state information obtained by the present operating state obtaining part 132 and the future operation schedule information obtained by the future operation schedule obtaining part 133. Although the estimation can cover any time length in the future direction, it is assumed that the operation prediction information is an estimation result for at least one hour or more, preferably about 12 hours, from the time of estimation.

Then, the future operation estimation part 135 stores the estimation result as the operation prediction information into the operation storage part 134. The operation prediction information includes, at least, a function module 120, the possibility that the function module 120 will be executed in the future, and time when the function module 120 will be executed.

The function module selection part 136 obtains a service definition list, which includes a list of a plurality of function modules 120 that an appliance 110 needs for executing a service, via the communication part 131.

Further, the function module selection part 136 specifies appliances 110 that have the function modules indicated in the service definition list as the function modules required for executing the service. Then, the function module selection part 136 specifies an execution plan in which the function modules 120 will be executed in the specified appliances 110 from the present to the future, based on the operation information stored in the operation storage part 134. A plurality of function modules executed for providing a service are also referred to as a function module group.

The function module selection part 136 includes a function module 120 in an execution plan when the possibility of execution of the function module 120 exceeds a threshold (a second threshold) according to the operation prediction information.

Next, the function module selection part 136 specifies a scenario to be employed and a plurality of appliances 110 that execute function modules 120 in the employed scenario, based on the appliance information list of each appliance 110 stored in the appliance information list storage part 137 and the obtained service definition list, so as not to hinder the specified execution plan. Then, the function module selection part 136 sends information indicating the specified scenario and the plurality of appliances 110 that execute the function modules 120 in the specified scenario to the appliance 110 that has activated the service, via the communication part 131. Here, the plurality of appliances 110 that execute any function module 120 in the employed scenario are referred to as a second appliance group.

Here, in the case where a plurality of appliances 110 can be made to execute a function module 120 or a combination of function modules 120 included in the employed scenario, the function module selection part 136 gives an execution priority to each of the plurality of appliances 110. The information sent to the appliance 110 that has activated the service includes such execution priorities also.

Further, for example, in order for the specified execution plan not to be hindered, the function module selection part 136 sums up for every hour the operation costs of executing the function modules 120 included in the execution plan and the operation costs of executing the function modules 120 that are executed for providing the selected service, so that the sum does not exceed a threshold (a first threshold: here 100).

In the case where the sum exceeds the threshold, the function module selection part 136 can make another appliance 110 execute at least one of the plurality of function modules 120 that are executed for providing the selected service, or can make another appliance 110 execute a function module 120 included in the execution plan.

The appliance information list storage part 137 stores the appliance information list sent from each appliance 110. Further, the appliance information list storage part 137 gives the stored appliance information lists to the function module selection part 136 at the time when the function module selection part 136 requires them.

Some or all of the present operating state obtaining part 132, the future operation schedule obtaining part 133, the future operation estimation part 135, and the function module selection part 136 described above can be each implemented, for example, by a memory 10 and a processor 11 such as a CPU for executing a program stored in the memory 10, as shown in FIG. 8(A). Such a program can be provided through a network or provided being recorded in a storage medium.

Further, the operation storage part 134 and the appliance information list storage part 137 described above can be each implemented by a memory 10.

Further, the communication part 131 can be implemented by a communication device such as a MC.

Further, some or all of the present operating state obtaining part 132, the future operation schedule obtaining part 133, the future operation estimation part 135, and the function module selection part 136 can be each implemented, for example, by a processing circuit 12 such as a single circuit, a composite circuit, a programmed processor, parallel-programmed processors, an ASIC, or a FPGA, as shown in FIG. 8(B).

Next, operation of each appliance 110 and the appliance behavior monitoring device 130 at the time when a service of certain appliance 110 is activated will be described.

First, an operation of a user or an operation of a function module 120 of an appliance 110 being used as a trigger, a notice to activate the service of one appliance 110 is sent to the service control part 114 of that one appliance 110. Here, the appliance 110 whose service is activated is referred to as a first appliance 110. The appliance 110 that triggers the activation may be different from or the same as the first appliance 110.

Next, the service control part 114 of the first appliance 110 obtains the service definition list corresponding to the service to be activated from the service definition list storage part 113 of the first appliance 110.

Subsequently, the service control part 114 of the first appliance 110 sends the obtained service definition list to the appliance behavior monitoring device 130 via the communication part 111.

Subsequently, the function module selection part 136 of the appliance behavior monitoring device 130 obtains operation information of appliances 110 having any one of the plurality of function modules 120 included in the obtained service definition list from the operation storage part 134, and obtains the appliance information lists of the appliances 110 having any one of the plurality of function modules 120 from the self-information list storage parts 112.

Subsequently, based on the obtained operation information and the obtained appliance information lists, the function module selection part 136 sends information indicating a scenario to be employed and a plurality of appliances 110 that execute the function modules 120 in the employed scenario to the first appliance 110 via the communication part 131, for the execution of the activated service.

Here, in some cases, the execution priorities indicating the execution possibilities of the function modules 120 may be included in the information sent to the first appliance 110.

As a method of determining the execution priorities, it is possible to mention, for example, a method (a selection method 1) in which when the first appliance 110 has a function module 120 required for the service, the function module 120 of the first appliance 110 is preferentially selected; or a method (a selection method 2) in which among the appliances 110 having a function module 120 required for the service, the function module 120 is selected so that the total operation cost of the function module 120 becomes the smallest in required time or duration for the service when the function module 120 required for the service is executed.

Subsequently, the service control part 114 of the first appliance 110 makes the plurality of appliances 110 specified by the function module selection part 136 execute the function modules 120 according to the scenario specified by the function module selection part 136.

According to the above-described operation, each function module 120 required for the service is executed, and as a result the service is executed.

Next, specific examples will be described with respect to execution of a service by the distributed coordination system 100 according to the embodiment 1.

Example 1

Figure 10:
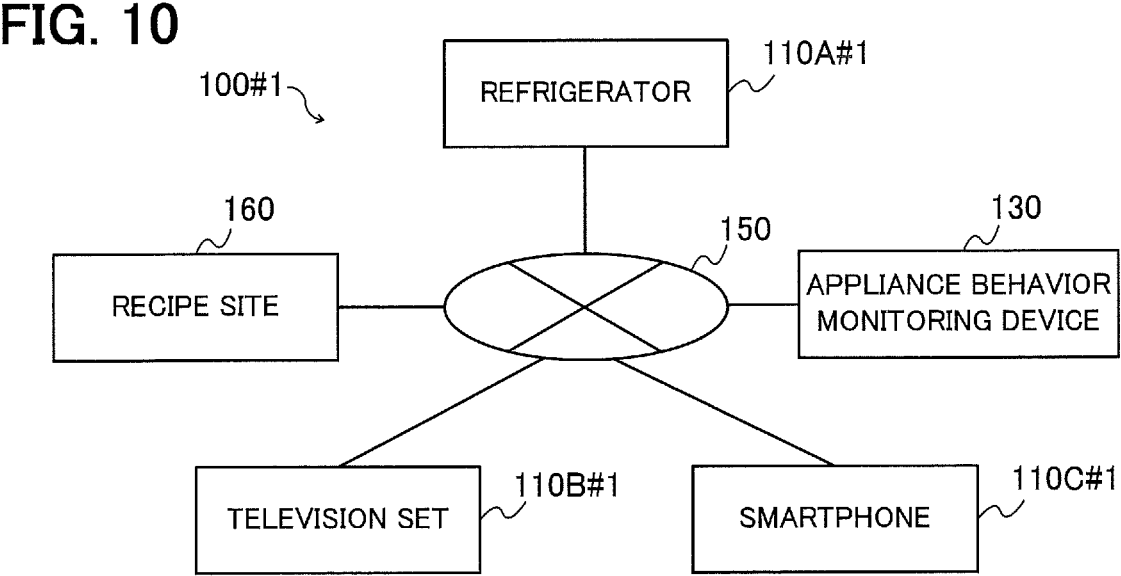
FIG. 10 is a schematic diagram showing a configuration of a distributed coordination system of an example 1 of the embodiment 1.

FIG. 10 is a schematic diagram showing a configuration of a distributed coordination system 10041 of an example 1.

The distributed coordination system 100#1 of the example 1 includes a refrigerator 110A#1, a television set 110B#1, a smartphone 110C#1, an appliance behavior monitoring device 130, and a recipe site 160.

Here, it is assumed that the refrigerator 110A#1, the television set 110B#1, and the smartphone 110C#1 can access the recipe site 160 through the Internet 150. The recipe site 160 is an ordinary recipe site that can be accessed by a smartphone or a personal computer. It is assumed that an appliance can similarly access the recipe site 160, to obtain information on a recipe.

Figure 11:
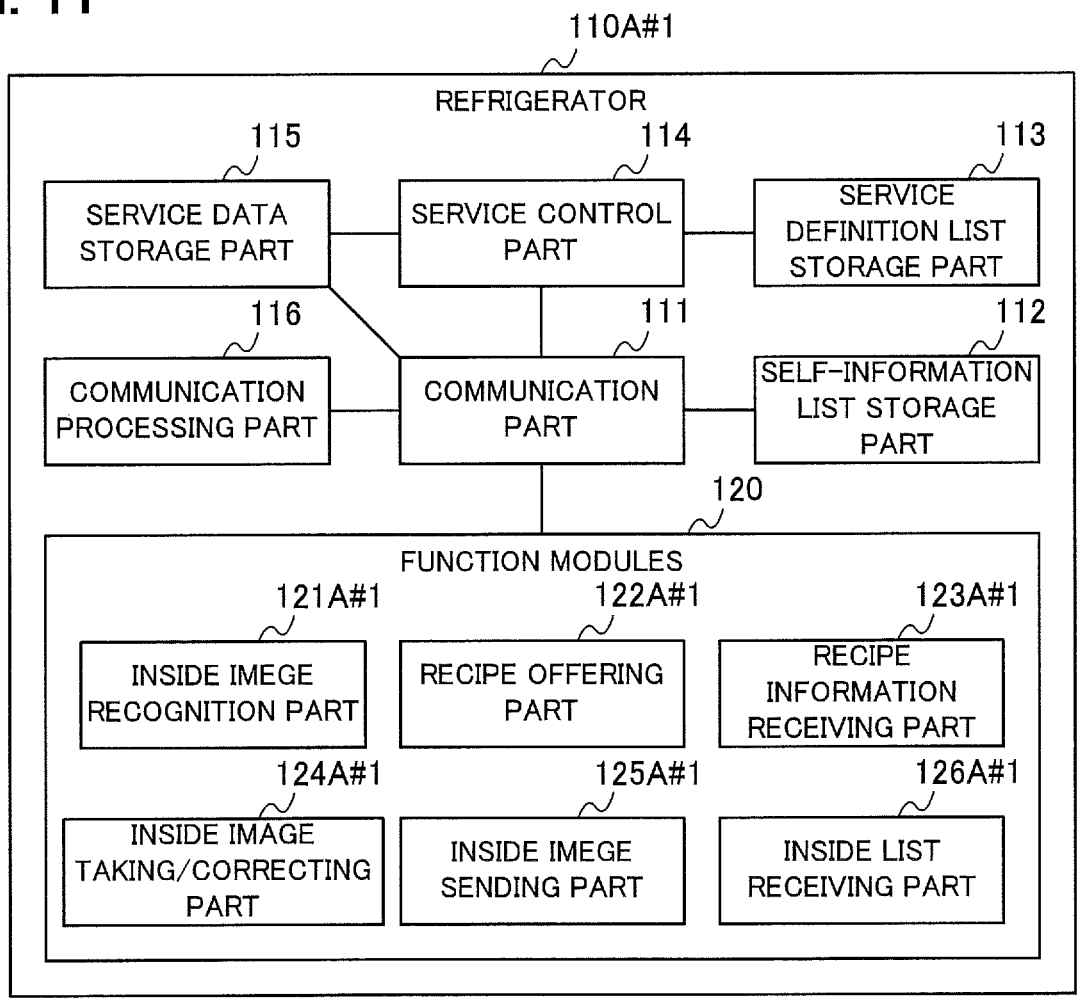
FIG. 11 is a block diagram showing schematically a configuration of a refrigerator in the example 1 of the embodiment 1.

FIG. 11 is a block diagram showing schematically a configuration of the refrigerator 110A#1.

The refrigerator 110A#1 includes a communication part 111, a self-information list storage part 112, a service definition list storage part 113, a service control part 114, a service data storage part 115, a communication processing part 116, and a function modules 120.

The function modules 120 of the refrigerator 110A#1 are an inside image recognition part 121A#1, a recipe offering part 122A#1, a recipe information receiving part 123A#1, an inside image taking/correcting part 124A#1, an inside image sending part 125A#1, and an inside list receiving part 126A#1.

The inside image recognition part 121A#1 recognizes refrigerator contents based on an image of the inside of the refrigerator 110A#1.

The recipe offering part 122A#1 determines a recipe to recommend.

The recipe information receiving part 123A#1 receives recipe information from another appliance 110 via the communication part 111.

The inside image taking/correcting part 124A#1 takes an image of the inside of the refrigerator 110A#1, and corrects and transforms the image to an image easily visible to a user.

The inside image sending part 125A#1 sends the taken image of the inside of the refrigerator 110A#1 to another appliance 110 via the communication part 111.

The inside list receiving part 126A#1 receives a list of refrigerator contents via the communication part 111.

Figure 12:
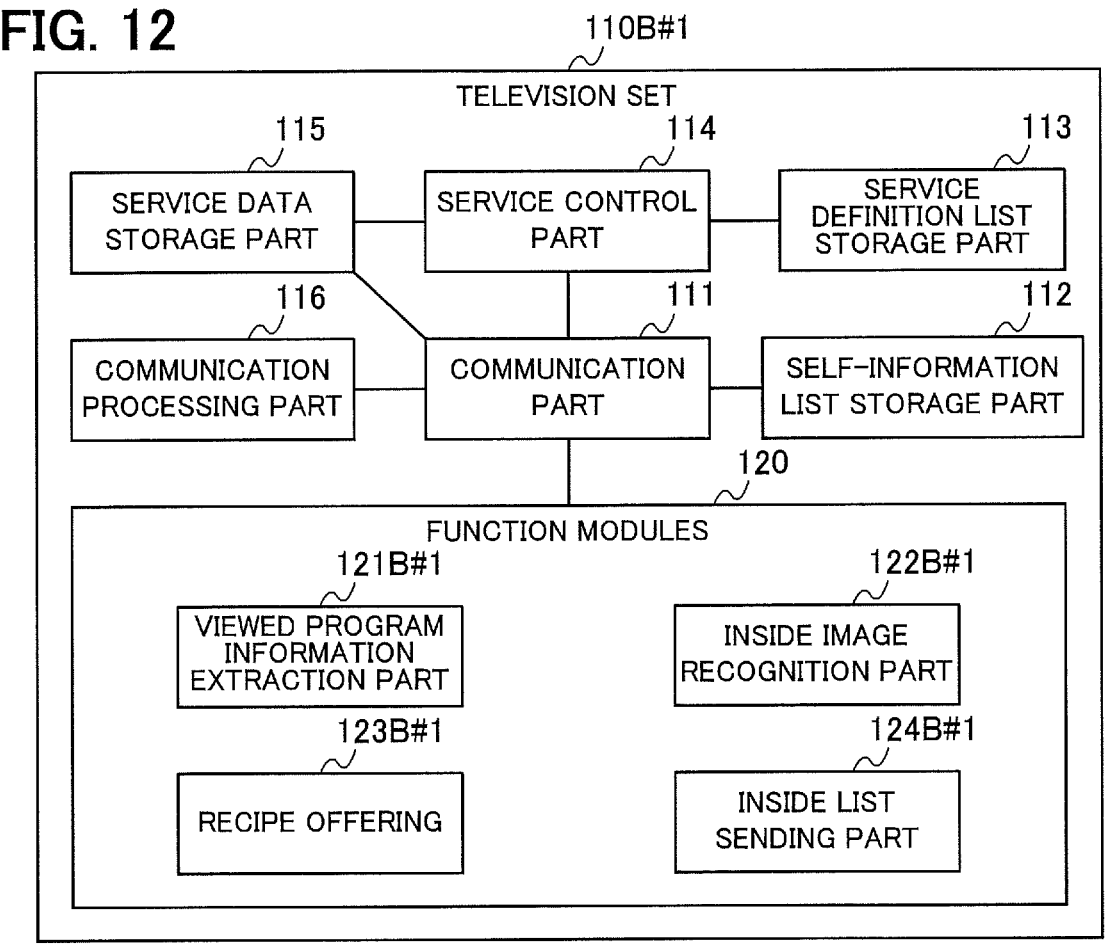
FIG. 12 is a block diagram showing schematically a configuration of a television set in the example 1 of the embodiment 1.

FIG. 12 is a block diagram showing schematically a configuration of the television set 110B#1.

The television set 110B#1 includes a communication part 111, a self-information list storage part 112, a service definition list storage part 113, a service control part 114, a service data storage part 115, a communication processing part 116, and function modules 120.

The function modules 120 of the television set 110B#1 are a viewed program information extraction part 121B#1, an inside image recognition part 122B#1, a recipe offering part 123B#1, and an inside list sending part 124B#1.

The viewed program information extraction part 121B#1 generates recipe information of a program under viewing.

The inside image recognition part 122B#1 recognizes refrigerator contents based on an image of the inside of the refrigerator 110A#1 received via the communication part 111.

The recipe offering part 123B#1 determines a recipe to recommend.

The inside list sending part 124B#1 sends a list of refrigerator contents via the communication part 111.

Figure 13:
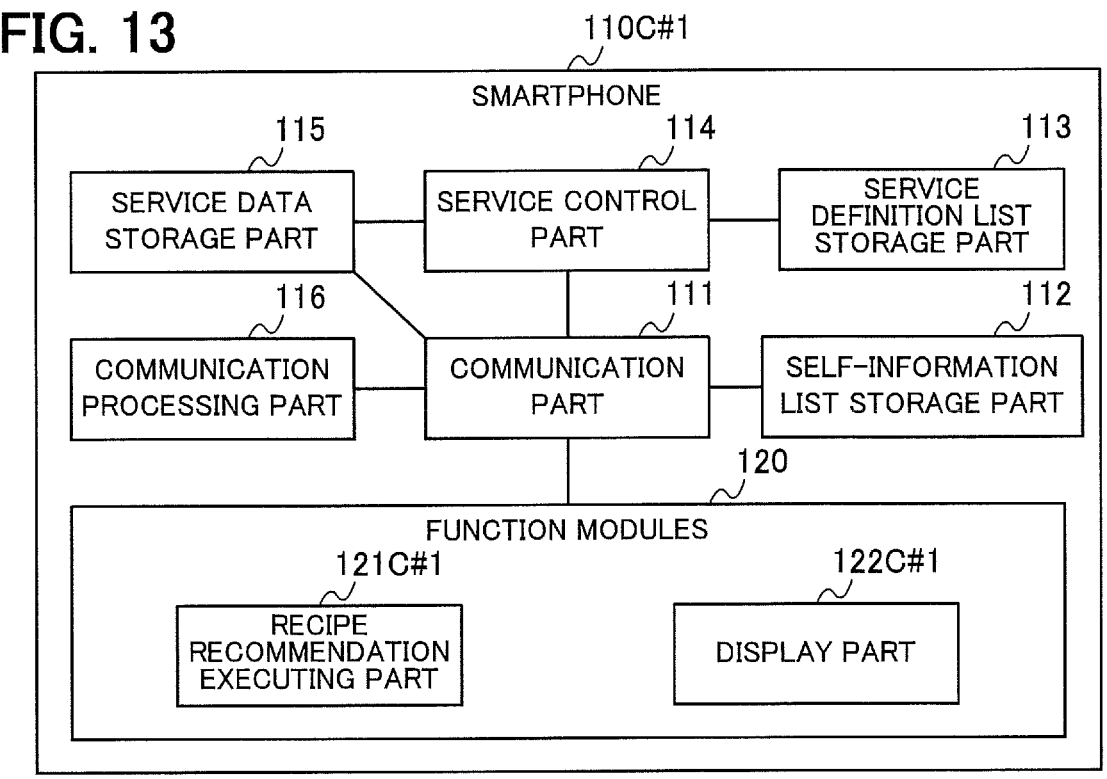
FIG. 13 is a block diagram showing schematically a configuration of a smartphone in the example 1 of the embodiment 1.

FIG. 13 is a block diagram showing schematically a configuration of the smartphone 1100#1.

The smartphone 110C#1 includes a communication part 111, a self-information list storage part 112, a service definition list storage part 113, a service control part 114, a service data storage part 115, a communication processing part 116, and function modules 120.

The function modules 120 of the smartphone 1100#1 are a recipe recommendation executing part 1210#1 and a display part 122C#1.

The recipe recommendation executing part 121C#1 executes a service of recommending a recipe.

The display part 122C#1 displays data on the smartphone 1100#1.

Although only the function modules 120 referred to in the example 1 are shown in FIGS. 11-13, this does not limit functions of each appliance 110.

FIG. 14 is a schematic diagram showing an appliance information list 112A#1 of the refrigerator 110A#1.

FIG. 15 is a schematic diagram showing an appliance information list 112B#1 of the television set 110B#1.

FIG. 16 is a schematic diagram showing an appliance information list 1120#1 of the smartphone 1100#1.

In the following, the case where the refrigerator 110A#1 executes a service "recipe recommendation using television viewing information" in the distributed coordination system 100#1 of the example 1 will be described.

The service "recipe recommendation using television viewing information" requires an "inside image recognition part", a "viewed program information extraction part", and a "recipe offering part" as function modules 120. According to the arrangement of the example 1, every function module 120 is included in the refrigerator 110A#1 or the television set 110B#1. Accordingly, to execute the service as a whole, it is necessary that these function modules 120 of the refrigerator 110A#1 and the television set 110B#1 are executed.

In the example 1, the selection method 1 is employed, and accordingly, as the "inside image recognition part" and the "recipe offering part", the inside image recognition part 121A#1 and the recipe offering part 122A#1 held in the refrigerator 110A#1 are selected preferentially as the function modules 120.

Further, it is assumed that, in the example 1, the selection of appliances 110 is carried out according to the selection method 2 if it is difficult to employ the selection method 1. In this case, to select function modules 120 of other appliances 110, it is necessary to select the scenario that activates the inside image sending part 125A#1 and the inside list receiving part 126A#1 as function modules 120 concerning sending and receiving image and inside list data in the refrigerator 110A#1.

First, it will be described the case where, when the service "recipe recommendation using television viewing information" is executed, the service is executed without causing control resource contention between function modules 120.

The assumed situation is that the refrigerator 110A#1 has a current inside image of the refrigerator and a user is viewing a program concerning meal on the television set 110B#1.

Further, it is assumed that the user becomes interested in the program under viewing on the television set 110B#1 and executed the recipe recommendation executing part 121C#1 of the smartphone 110C#1 to activate the service "recipe recommendation using television viewing information". Here, although the method using the recipe recommendation executing part 121C#1 of the smartphone 110C#1 is described as an example of activating the service, it does not matter if the refrigerator 110A#1 or the television set 110B#1 has the same function, for example.

When the service is activated, the service control part 114 of the refrigerator 110A#1 obtains the service definition list of the service "recipe recommendation using television viewing information" from the service definition list storage part 113. Subsequently, the service control part 114 of the refrigerator 110A#1 sends the service definition list to the appliance behavior monitoring device 130 via the communication part 111.

The function module selection part 136 of the appliance behavior monitoring device 130 compares the service definition list sent from the refrigerator 110A#1 with the appliance information lists stored in the appliance information list storage part 137, and makes a list of appliances 110 for which existence of resource contention is to be examined and calculates estimation of operation costs of those appliances.

Figure 18:
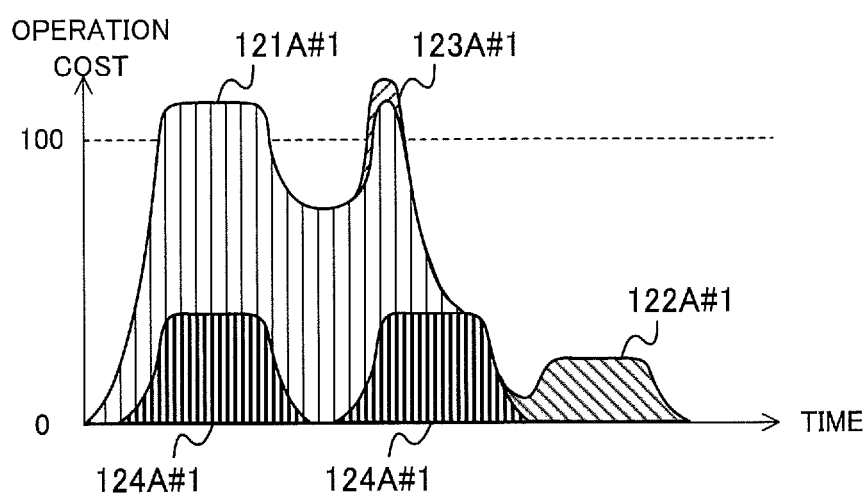
FIG. 18 is a schematic diagram showing a second example of time fluctuation of operation cost in the example 1 of the embodiment 1.
Figure 19:
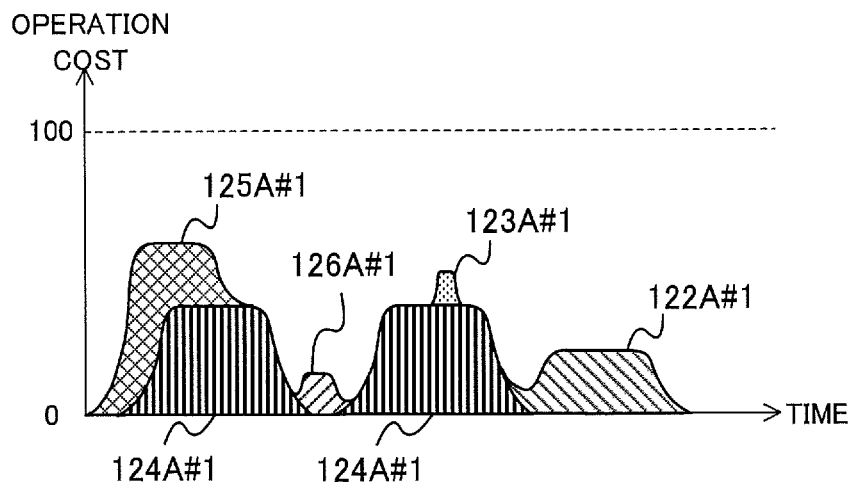
FIG. 19 is a schematic diagram showing a third example of time fluctuation of operation cost in the example 1 of the embodiment 1.

FIG. 17 shows a first example of time fluctuation of the operation cost of the refrigerator 110A#1 in the example 1. FIG. 18 shows a second example of time fluctuation of the operation cost of the refrigerator 110A#1 in the example 1. Further, FIG. 19 shows a third example of time fluctuation of the operation cost of the refrigerator 110A#1 in the example 1.

Since there is no operation information indicating occurrence of resource contention with respect to this execution of the service, it is found that the operation cost of the refrigerator 110A#1 does not exceed 100 even when the selection method 1 is employed, as shown for example in the time fluctuation of the operation cost in FIG. 17.

In the case shown in FIG. 17, there is no function module 120 that is executed in the execution plan specified by the operation information, and accordingly only the operation costs of the function modules 120 required for providing the service "recipe recommendation using television viewing information" are summed.

Thus, as the function modules 120 of "inside image recognition part" and "recipe offering part", the function module selection part 136 selects use of the function modules 120 held by the refrigerator A#1. Then, the function module selection part 136 sends the selection result to the service control part 114.

The service control part 114 of the refrigerator 110A#1 activates the inside image recognition part 121A#1 of the refrigerator 110A#1, recognizes the contents of the refrigerator 110A#1 by using the current inside image, and generates list data of the inside contents. As a method of recognizing the contents of the refrigerator 110A#1 by using the inside image, it is possible to mention for example the template matching method for image, although another method can be used.

Further, when the above service is activated, the service control part 114 of the refrigerator 110A#1 activates the viewed program information extraction part 121B#1 that is a function module 120 of the television set 110B#1. From the program under viewing, the viewed program information extraction part 121B#1 generates data on food materials required for the recipe, as the recipe information of the program under viewing, and sends the generated recipe information to the recipe information receiving part 123A#1 of the refrigerator 110A#1. Alternatively, as a method of generating recipe information of the program under viewing, it is possible that the viewed program information extraction part 121B#1 extracts a recipe name from caption contained in the broadcast wave data and searches the recipe site 160 by using the extracted recipe name, to obtain recipe information. Further, as a method of generating recipe information of the program under viewing, the viewed program information extraction part 121B#1 can obtain recipe information by applying a character recognition method to a displayed image, in the case where a recipe of the program under viewing is displayed on the screen of the television set 110B#1.

When the service control part 114 of the refrigerator 110A#1 obtains the list data of the inside contents and the recipe information of the program under viewing, the service control part 114 activates the recipe offering part 122A#1 of the refrigerator 110A#1.

The activated recipe offering part 122A#1 compares the list data of the inside contents with the recipe information of the program under viewing. If the recipe information substantially coincides with the inside contents, the recipe offering part 122A#1 determines the recipe information of the program under viewing as a recipe to recommend just as it is. If the recipe information of the program under viewing is greatly different from the inside contents and the user must buy food materials in large quantity in order to follow the recipe, the recipe offering part 122A#1 searches the recipe site 160 by using the recipe name and determines as a recipe to recommend at least one recipe among recipes each having a higher coincidence ratio between the food materials used in the recipe and the inside contents. Here, whether the recipe information of the program under viewing is substantially coincident with the inside contents or greatly different from the inside contents may be determined based on whether the coincidence ratio between the inside contents and the contents used in the recipe information is larger than or equal to a predetermined threshold.

When the recipe offering part 122A#1 determines the recipe to recommend, the recipe offering part 122A#1 sends the recipe information to the smartphone 110C#1 via the communication part 111. The display part 122C#1 of the smartphone 110C#1 offers the recipe information to the user in response to an instruction from the service control part 114 of the refrigerator 110A#1.

Next, it will be described a case where, when a plurality of function modules 120 are executed, control resource contention occurs in an appliance 110 and the operation cost exceeds 100. Specifically, it is an assumed state that the future operation estimation part 135 of the appliance behavior monitoring device 130 estimates a high possibility of a time period in which the inside image taking/correcting part 124A#1 as an its own function module 120 of the refrigerator 110A#1 is activated.

In other words, it is a state that, in one appliance 110, execution of a function module 120 included in the execution plan contends with execution of the function module 120 required for providing the service.

It is assumed that the refrigerator 110A#1 has a current inside image of the refrigerator 110A#1 and a user is viewing a program concerning meal on the television set 110B#1, and in this state the user executes the recipe recommendation executing part 121C#1 in the smartphone 1100#1 to activate the service "recipe recommendation using television viewing information".

When the service is activated, the service control part 114 of the refrigerator 110A#1 obtains the service definition list of the service "recipe recommendation using television viewing information" from the service definition list storage part 113, and sends the obtained service definition list to the appliance behavior monitoring device 130 via the communication part 111.

The function module selection part 136 of the appliance behavior monitoring device 130 compares the service definition list sent from the refrigerator 110A#1 with the appliance information list stored in the appliance information list storage part 137, and makes a list of appliances 110 for which existence of resource contention is to be examined and calculates estimation of operation costs of those appliances.

As for this execution of the above-mentioned service, it is found by the future operation estimation part 135 that there is a high possibility of activation of the inside image taking/correcting part 124A#1 of the refrigerator 110A#1. In other words, there is an execution plan in which the inside image taking/correcting part 124A#1 is executed. Accordingly, the time fluctuation of the operation cost of the refrigerator 110A#1 becomes as shown in FIG. 18 for example, and it is found that the operation cost exceeds 100 when the selection method 1 is employed.

In FIG. 18, the operation cost of the inside image taking/correcting part 124A#1 executed by the execution plan, and the operation costs of the inside image recognition part 121A#1, the recipe information receiving part 123A#1, and the recipe offering part 122A#1 required for providing the service are summed for every hour.

Thus, the function module selection part 136 examines other appliances 110 for executing the "inside image recognition part" and the "recipe offering part" as the function modules 120 required for providing the service. As shown in FIG. 19, it is assumed that, as a result, the operation cost of each appliance is found not to exceed 100 when the inside image sending part 125A#1 and the inside list receiving part 126A#1 are executed in the refrigerator 110A#1 and the inside image recognition part 122B#1 and the inside list sending part 124B#1 are executed in the television set 110B#1. In this case, the function module selection part 136 selects a scenario using the function module 120 of the television set 110B#1 as the "inside image recognition part" and the function module 120 of the refrigerator 110A#1 as the "recipe offering part". Then, the function module selection part 136 sends this selection result to the service control part 114.

Next, the service control part 114 of the refrigerator 110A#1 activates the inside image sending part 125A#1 of the refrigerator 110A#1. The activated inside image sending part 125A#1 sends the current inside image to the television set 110B#1 via the communication part 111.

The service control part 114 of the refrigerator 110A#1 activates the inside image recognition part 122B#1 and the inside list sending part 124B#1 of the television set 110B#1. Then, the activated inside image recognition part 122B#1 recognizes the contents of the refrigerator 110A#1 by using the current inside image, and generates list data of the inside contents. Subsequently, the inside list sending part 124B#1 of the television set 110B#1 sends the list data of the inside contents to the refrigerator 110A#1 via the communication part 111.

Further, when the above-mentioned service is activated, the service control part 114 of the refrigerator 110A#1 activates the viewed program information extraction part 121B#1 of the television set 110B#1. The activated viewed program information extraction part 121B#1 generates, as recipe information of the program under viewing, data on the food material required for the recipe, from the program under viewing, and sends the generated recipe information to the refrigerator 110A#1 via the communication part 111.

The inside list receiving part 126A#1 of the refrigerator 110A#1 obtains the list data of the inside contents via the communication part 111, and the recipe information receiving part 123A#1 of the refrigerator 110A#1 obtains the recipe information of the program under viewing via the communication part 111. Then, the service control part 114 of the refrigerator 110A#1 activates the recipe offering part 122A#1 of the refrigerator 110A#1. The activated recipe offering part 122A#1 compares the list data of the inside contents with the recipe information of the program under viewing, and determines a recipe to offer. Then, the recipe offering part 122A#1 sends the recipe information of the recipe to offer, to the smartphone 1100#1 via the communication part 111.

The service control part 114 of the refrigerator 110A#1 activates the display part 122C#1 of the smartphone 110C#1, and the activated display part 1220#1 offers the recipe information to the user.

As described in the above example, if there is a high possibility that the inside image taking/correcting part 124A#1 as an function module 120 for the refrigerator 110A#1 is activated, the refrigerator 110A#1 uses the inside image recognition part 122B#1 of the television set 110B#1 as the "inside image recognition part", which is a function module 120 that can be activated in the refrigerator 110A#1, thereby the service "recipe recommendation using television viewing information" desired by the user can be executed without hindering the refrigerator 110A#1 from executing the function for its own refrigerator 110A#1.

Example 2

Figure 20:
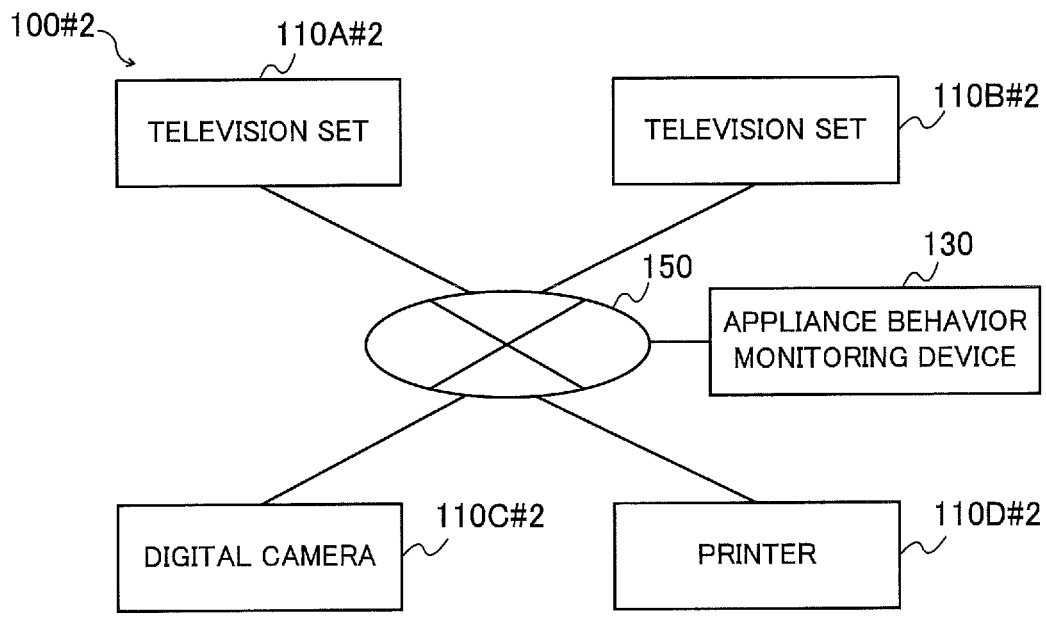
FIG. 20 is a schematic diagram showing a configuration of a distributed coordination system of an example 2 of the embodiment 1.

FIG. 20 is a schematic diagram showing a configuration of a distributed coordination system 100#2 of an example 2.

The distributed coordination system 100#2 of the example 2 includes a television set 110A#2, a television set 110B#2, a digital camera 110C#2, a printer 110D#2, and an appliance behavior monitoring device 130.

Figure 21:
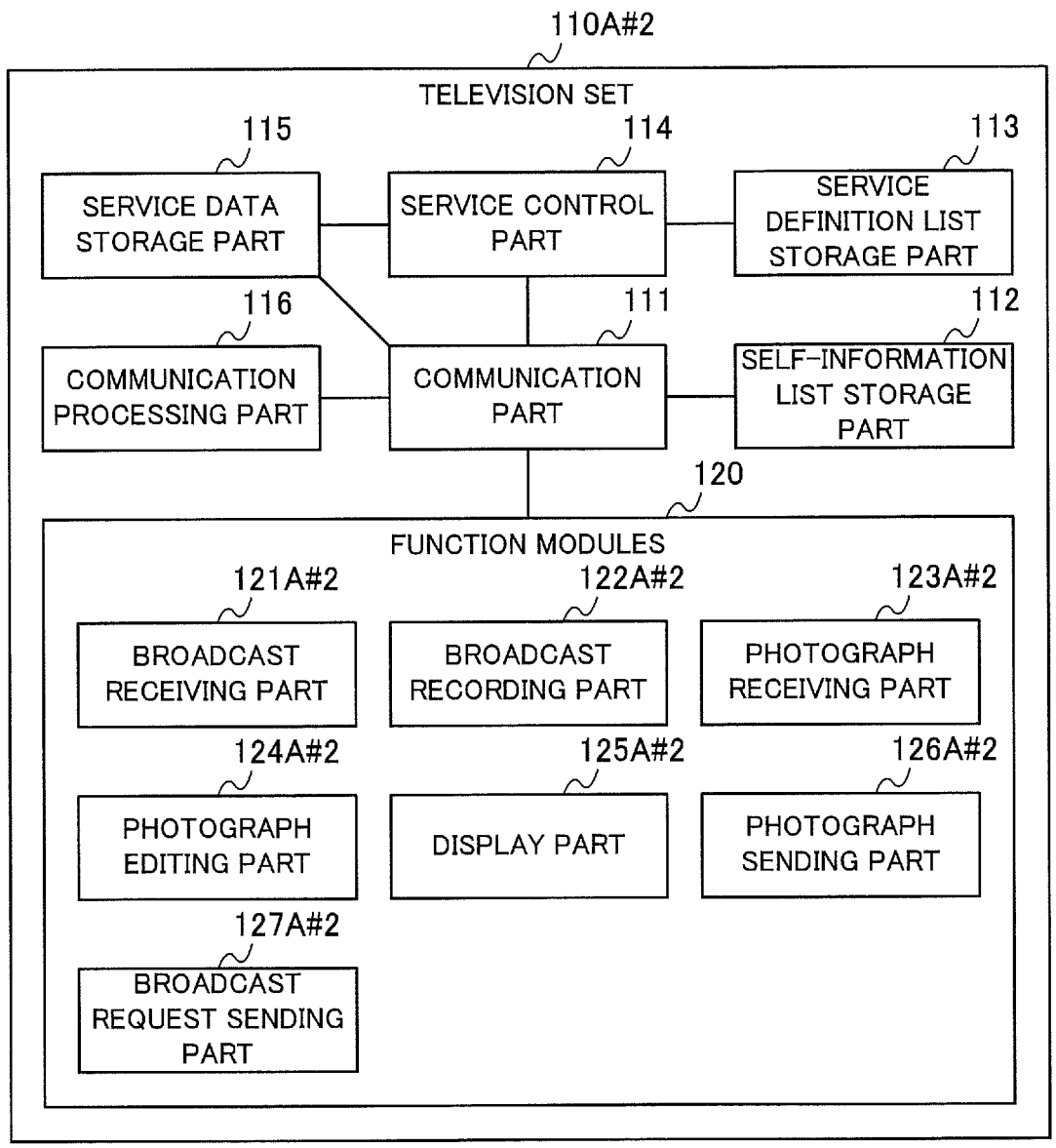
FIG. 21 is a block diagram showing schematically a configuration of a first television set of the example 2 of the embodiment 1.

FIG. 21 is a block diagram showing schematically a configuration of the television set 110A#2.

The television set 110A#2 includes a communication part 111, a self-information list storage part 112, a service definition list storage part 113, a service control part 114, a service data storage part 115, a communication processing part 116, and function modules 120.

The function modules 120 of the television set 110A#2 are a broadcast receiving part 121A#2, a broadcast recording part 122A#2, a photograph receiving part 123A#2, a photograph editing part 124A#2, a display part 125A#2, a photograph sending part 126A#2, and a broadcast request sending part 127A#2.

The broadcast receiving part 121A#2 receives a broadcast.

The broadcast recording part 122A#2 records a broadcast.

The photograph receiving part 123A#2 receives an image from the digital camera 110C#2 via the communication part 111.

The photograph editing part 124A#2 carries out operation on data of a plurality of photographs taken by the digital camera 110C#2, to unites the photographs into one image.

The display part 125A#2 displays a photograph under broadcasting or editing.

The photograph sending part 126A#2 sends a photograph via the communication part 111.

The broadcast request sending part 127A#2 requests execution of broadcast recording to the other television set 110B#2 via the communication part 111.

Figure 22:
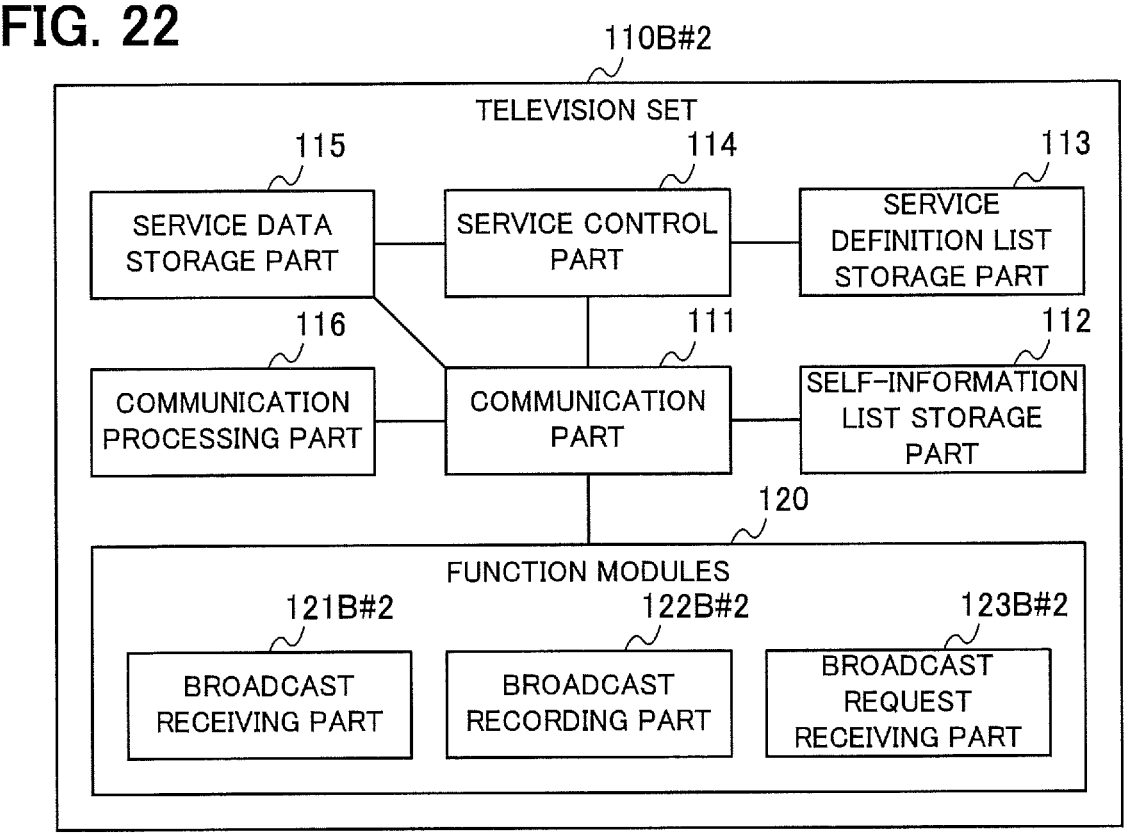
FIG. 22 is a block diagram showing schematically a configuration of a second television set of the example 2 of the embodiment 1.

FIG. 22 is a block diagram showing schematically a configuration of the television set 110B#2.

The television set 110B#2 includes a communication part 111, a self-information list storage part 112, a service definition list storage part 113, a service control part 114, a service data storage part 115, a communication processing part 116, and function modules 120.

The function modules 120 of the television set 110B#2 are a broadcast receiving part 121B#2, a broadcast recording part 122B#2, and a broadcast request receiving part 123B#2.

The broadcast receiving part 121B#2 receives a broadcast.

The broadcast recording part 122B#2 records a broadcast.

The broadcast request receiving part 123B#2 receives a broadcast recording request from the other television set 110A#2 via the communication part 111.

Figure 23:
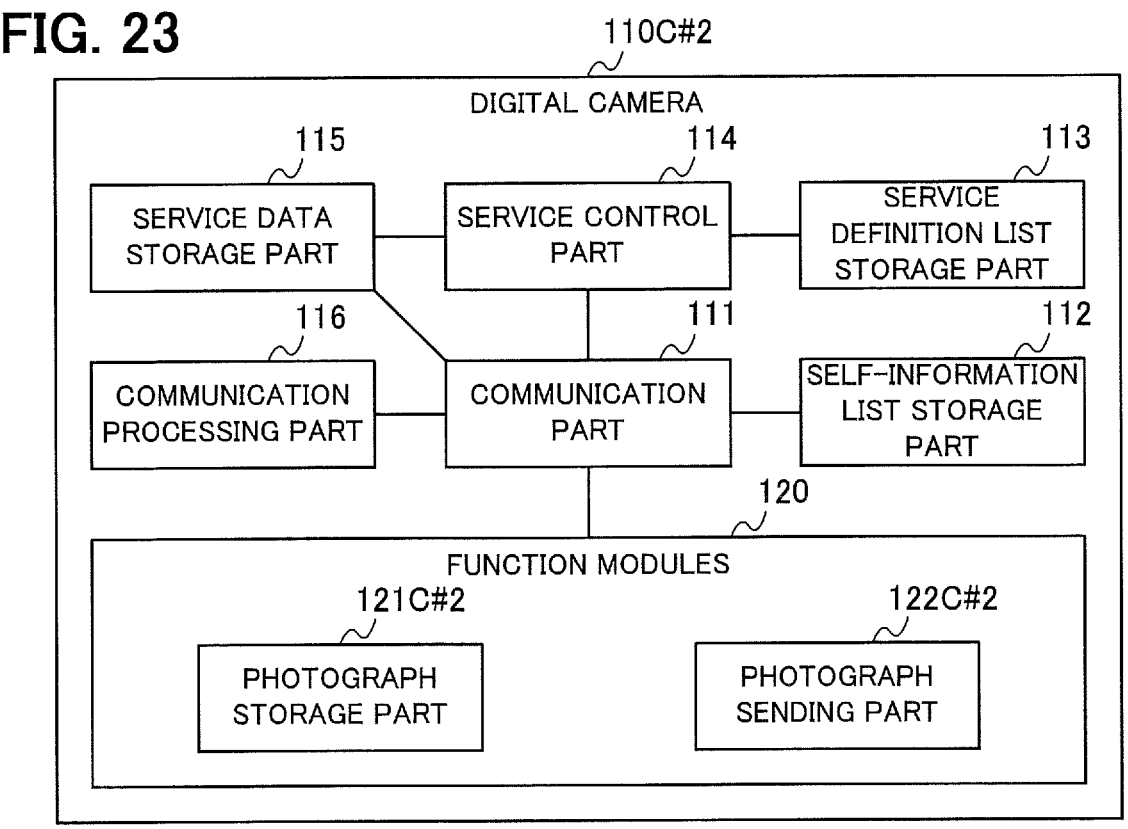
FIG. 23 is a block diagram showing schematically a configuration of a digital camera of the example 2 of the embodiment 1.

FIG. 23 is a block diagram showing schematically a configuration of the digital camera 110C#2.

The digital camera 110C#2 includes a communication part 111, a self-information list storage part 112, a service definition list storage part 113, a service control part 114, a service data storage part 115, a communication processing part 116, and function modules 120.

The function modules 120 of the digital camera 110C#2 are a photograph storage part 121C#2 and a photograph sending part 122C#2.

The photograph storage part 121C#2 stores photographs.

The photograph sending part 122C#2 sends stored photographs via the communication part 111.

Figures 24, 25:
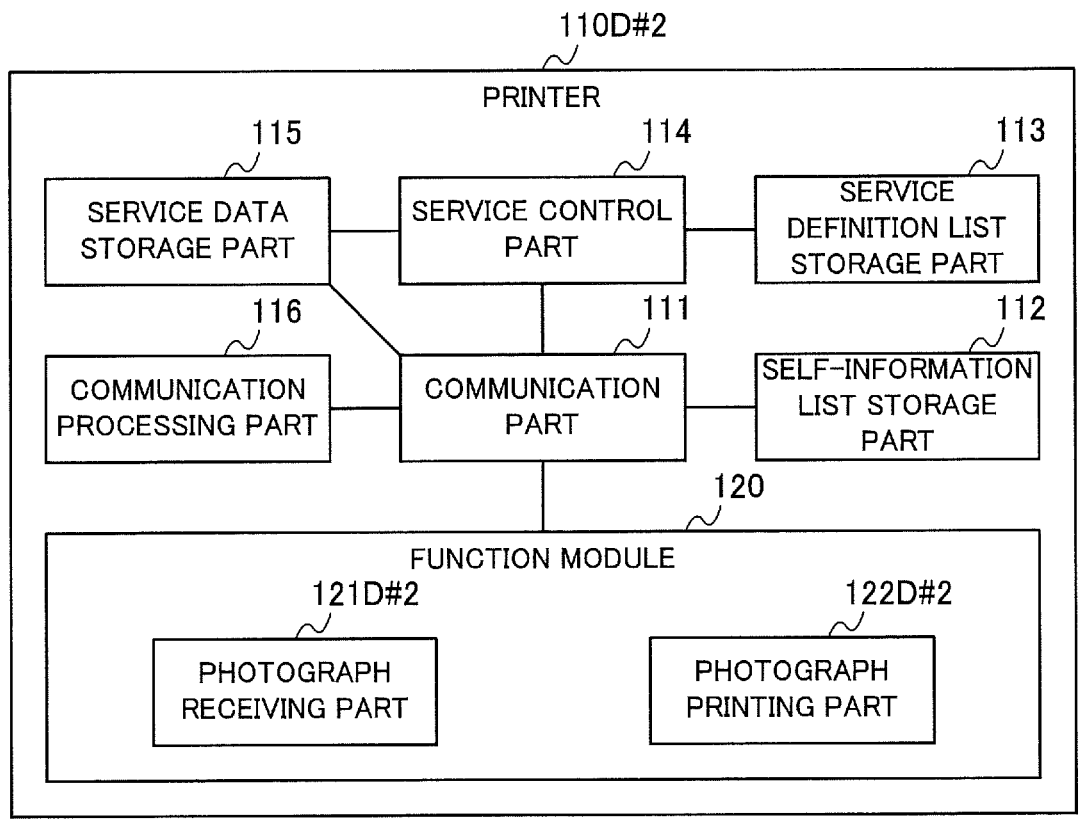
FIG. 24 is a block diagram showing schematically a configuration of a printer of the example 2 of the embodiment 1.
FIG. 25 is a schematic diagram showing an appliance information list of the television set of the example 2 of the embodiment 1.

FIG. 24 is a block diagram showing schematically a configuration of the printer 110D#2.

The printer 110D#2 includes a communication part 111, a self-information list storage part 112, a service definition list storage part 113, a service control part 114, a service data storage part 115, a communication processing part 116, and function modules 120.

The function modules 120 of the printer 110D#2 are a photograph receiving part 121D#2 and a photograph printing part 122D#2.

The photograph receiving part 121D#2 receives a photograph via the communication part 111.

The photograph printing part 122D#2 prints a photograph.

Although only the function modules 120 referred to in the example 2 are shown in FIGS. 21-24, this does not limit functions of each appliance 110.

FIG. 25 is a schematic diagram showing the appliance information list 112A#2 of the television set 110A#2.

In the following, it will be described the case where the user executes a service "digital camera image editing and printing" on the television set 110A#2 at 15:30 in a state that recording of two programs of respectively 2 hours from 15:00 and 2 hours from 16:00 are reserved as its own operation "recording of television program" in the television set 110A#2 in the configuration of the distributed coordination system 100#2 of the example 2.

Its own operation "recording of television program" requires a "broadcast receiving part" and a "broadcast recording part". Further, the service "digital camera image editing and printing" requires a "photograph receiving part", a "photograph editing part", a "display part", and a "photograph sending part" of an appliance 110 operated by the user; and requires further the "photograph storage part" and the "photograph sending part" of the digital camera 110C#2 and the "photograph receiving part" and the "photograph printing part" of the printer 110D#2, with those parts of the digital camera 110C#2 and the printer 110D#2 being selected by the user in the course of execution of the service.

First, the user activates the service "digital camera image editing and printing" on the television set 110A#2.

When the service is activated, the service control part 114 of the television set 110A#2 obtains the service definition list corresponding to the service "digital camera image editing and printing" from the service definition list storage part 113, and sends the obtained service definition list to the appliance behavior monitoring device 130 via the communication part 111.

The function module selection part 136 of the appliance behavior monitoring device 130 compares the service definition list sent from the television set 110A#2 with the appliance information lists stored in the appliance information list storage part 137, and makes a list of appliances 110 for which existence of resource contention is to be examined and calculates estimation of operation costs of those appliances.

Figure 26:
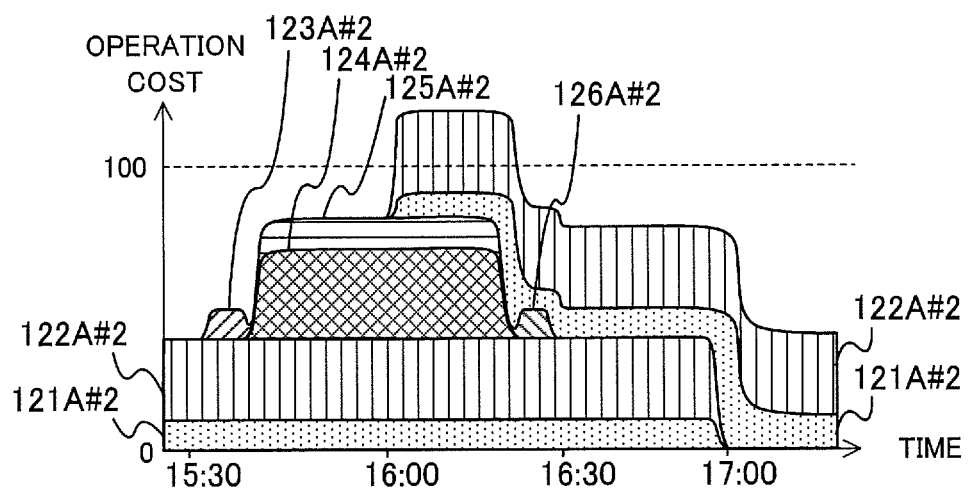
FIG. 26 is a schematic diagram showing a first example of time fluctuation of operation cost in the example 2 of the embodiment 1.
Figure 27:
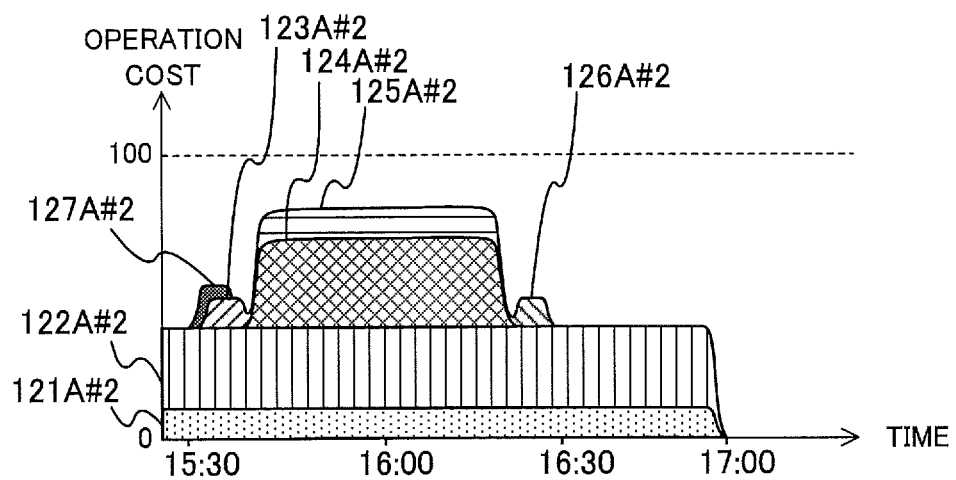
FIG. 27 is a schematic diagram showing a second example of time fluctuation of operation cost in the example 2 of the embodiment 1.

FIG. 26 shows a first example of time fluctuation of the operation cost of the television set 110A#2 of the example 2. Further, FIG. 27 shows a second example of time fluctuation of the operation cost of the television set 110A#2 of the example 2.

As for this execution of the service, since the television set 110A#2 is selected as the appliance 110 operated by the user, it is definitely determined that the photograph receiving part 123A#2, the photograph editing part 124A#2, the display part 125A#2, and the photograph sending part 126A#2 of the television set 110A#2 are executed from 15:30. It is assumed that the future operation estimation part 135 estimates that this operation continues for one hour.

Further, by the future operation schedule obtaining part 133, it is known that the broadcast receiving part 121A#2 and the broadcast recording part 122A#2 of the television set 110A#2 are executed by two processes. Accordingly, the time fluctuation of the operation cost of the television set 110A#2 becomes as shown in FIG. 26, for example, and it is found that the operation cost exceeds 100 as it is.

In FIG. 26, the operation costs of the broadcast receiving part 121A#2 and the broadcast recording part 122A#2 executed by the execution plan and the operation costs of the photograph receiving part 123A#2, the photograph editing part 124A#2, the display part 125A#2, and the photograph sending part 126A#2 required for providing the service are summed for every hour.

Thus, the function module selection part 136 examines execution of "recording of television program" from 16:00 by another appliance 110. It is assumed that, as shown in FIG. 27, as a result the operation cost of each appliance is found not to exceed 100 when the broadcast request sending part 127A#2 is executed in the television set 110A#2 and the broadcast receiving part 121B#2, the broadcast recording part 122B#2, and the broadcast request receiving part 123B#2 are executed in the television set 110B#2.

In this case, the function module selection part 136 selects a scenario so that, as for the "broadcast receiving part" and the "broadcast recording part", the function modules 120 held by the television set 110B#2 are used. Then, the function module selection part 136 sends this selection result to the service control part 114 of the television set 110A#2. Here, in addition to the specified scenario and information on the plurality of appliance 110 to execute the function modules 120 in the specified scenario, an instruction to make the television set 110B#2 as another appliance 110 execute the operation "recording of television program" is sent to the service control part 114.

Next, in order to cancel execution of the "recording of television program" as an operation in the television set 110A#2, the service control part 114 of the television set 110A#2 cancels the reservation of operations of the broadcast receiving part 121B#2 and the broadcast recording part 122B#2. Further, the service control part 114 of the television set 110A#2 activates the broadcast request receiving part 123B#2 of the television set 110B#2 and the broadcast request sending part 127A#2 of the television set 110A#2, and executes a recording request from the television set 110A#2 to the television set 110B#2 via the communication part 111.

Based on the content of the recording request received via the communication part 111, the broadcast request receiving part 123B#2 of the television set 110B#2 enters a standby state to execute the broadcast receiving part 121B#2 and the broadcast recording part 122B#2 at the designated time.

Further, on the other hand, the service control part 114 of the television set 110A#2 can execute the service "digital camera image editing and printing" by activating the photograph receiving part 123A#2, the photograph editing part 124A#2, the display part 125A#2, and the photograph sending part 126A#2; the photograph storage part 121C#2; the photograph sending part 122C#2 of the digital camera 110C#2; and the photograph receiving part 121D#2 and the photograph printing part 122D#2 of the printer 110D#2, which are required for the above-mentioned service.

As described above, according to the embodiment 1, the function module selection part 136 refers to the operation information, i.e. the present operating states, the future operation schedules, and the future operation predictions, of the appliances 110, so as to select a scenario to execute appliances 110 for executing function modules required for a service, and the service control part 114 activates the function modules 120 of each appliance 110 based on the selected scenario. Accordingly, the distributed coordination system 100 can select function modules 120 of suitable appliances 110 under conditions that priorities are given to the operations of the appliances 110 itself, without hindering the appliances from executing its own functions of in the present and the future, and as a result it is possible to execute the service smoothly.

The above two examples have been described in the case where the operation cost of the appliance 110 in which the service control part 114 is operating exceeds 100. However, similarly in the case where the operation cost of an appliance 110 in which the service control part 114 is not operating exceeds 100, the function module selection part 136 can select a scenario so that the operation cost of the appliance 110 in which the service control part 114 is not operating does not exceed 100.

Further, the appliance behavior monitoring device 130 in the embodiment 1 has the future operation estimation part 135 that performs future operation prediction based on the present operating state information and the future operation schedule information. However, the future operation estimation part 135 can be omitted. In that case, the function module selection part 136 can specify an execution plan based on the present operating state information and the future operation schedule information.

Embodiment 2

Figure 28:
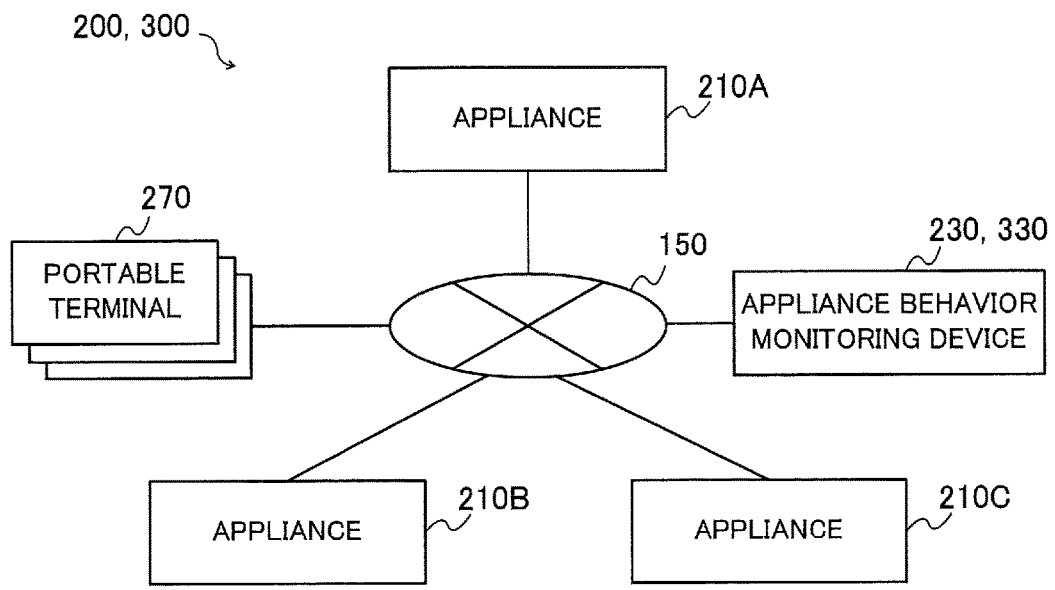
FIG. 28 is a schematic diagram showing a configuration of a distributed coordination system according to an embodiment 2.

FIG. 28 is a schematic diagram showing a configuration of a distributed coordination system 200 according to an embodiment 2.

The distributed coordination system 200 includes a plurality of appliances 210, an appliance behavior monitoring device 230, and portable terminals 270.

The appliances 210, the appliance behavior monitoring device 230, and the portable terminals 270 are connected to the Internet 150.

The distributed coordination system 200 of the embodiment 2 includes the portable terminals 270 for operating the appliances 210 via the Internet 150, and the number of the portable terminals 270 is equal to the number of users of the distributed coordination system 200.

The users of the distributed coordination system 200 are for example house residents, and the portable terminals 270 are smartphones held by each of the residents. It is assumed that each portable terminal 270 is coupled with its user. To operate each appliance 210, each user of the distributed coordination system 200 may use an application in the portable terminal 270 or use buttons or a remote control provided for the appliance 210.

As shown in FIG. 2, an appliance 210-1 as a first example of configuration of the appliances 210 in the embodiment 2 includes a communication part 111, a self-information list storage part 112, a service definition list storage part 113, a service control part 114, a service data storage part 115, a communication processing part 216, and function modules 120.

The appliance 210-1 as the first example of configuration of the appliances 210 in the embodiment 2 is constructed similarly to the appliance 110-1 as the first example of configuration of the appliances 110 in the embodiment 1 except for the communication processing part 216.

As shown in FIG. 3, an appliance 210-2 as a second example of configuration of the appliances 210 in the embodiment 2 includes a communication part 111, a self-information list storage part 112, a communication processing part 216, and function modules 120.

The appliance 210-2 as the second example of configuration of the appliances 210 in the embodiment 2 is constructed similarly to the appliance 210-1 as the second example of configuration of the appliances 110 in the embodiment 1 except for the communication processing part 216.

The communication processing part 216 receives an obtaining request for a present operation operating state from the appliance behavior monitoring device 230 via the communication part 111, and, in response to the request, sends present operating state information that indicates the present operating state of its own appliance 210 and future operation schedule information that indicates the future operation schedule of its own appliance 210 to the appliance behavior monitoring device 230 via the communication part 111. Here, in the embodiment 2, in the case where a portable terminal 270 is used for operation, the present operating state information and the future operation schedule information each include portable terminal identification information that is identification information for identifying the used portable terminal 270.

Figure 29:
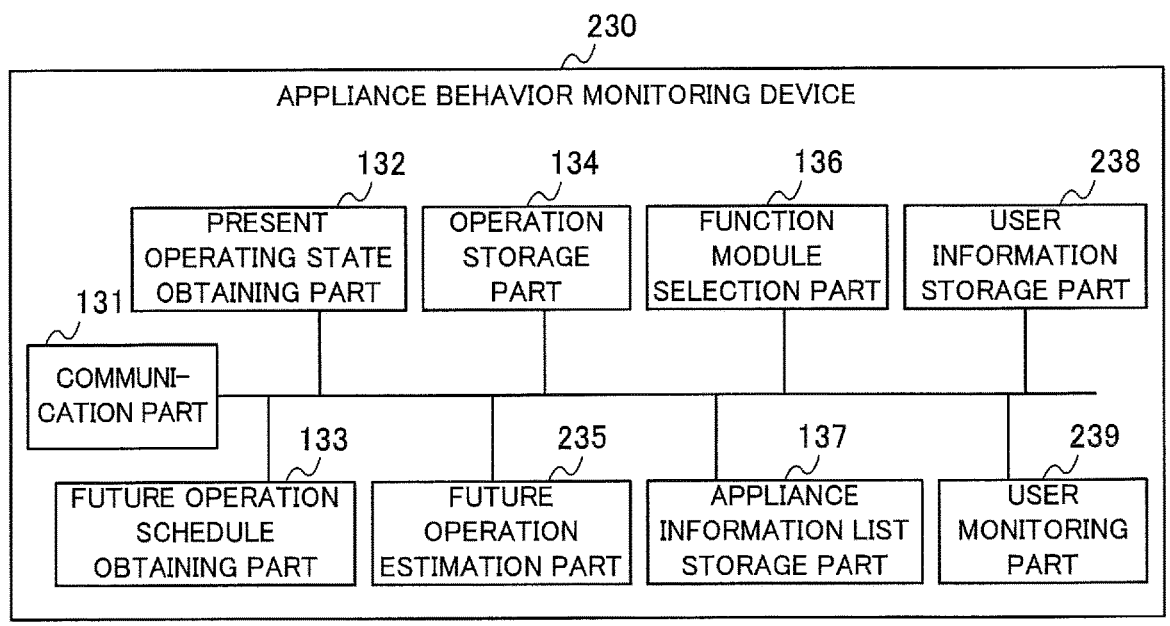
FIG. 29 is a schematic diagram showing a configuration of an appliance behavior monitoring device in the embodiment 2.

FIG. 29 is a schematic diagram showing a configuration of the appliance behavior monitoring device 230 in the embodiment 2.

The appliance behavior monitoring device 230 includes a communication part 131, a present operating state obtaining part 132, a future operation schedule obtaining part 133, an operation storage part 134, a future operation estimation part 235, a function module selection part 136, an appliance information list storage part 137, a user information storage part 238, and a user monitoring part 239.

The appliance behavior monitoring device 230 in the embodiment 2 is constructed similarly to the appliance behavior monitoring device 130 in the embodiment 1 except for the future operation estimation part 235, the user information storage part 238, and the user monitoring part 239.

The user information storage part 238 stores user information that associates portable terminal identification information for identifying a portable terminal 270 with user identification information that is identification information for identifying a user coupled to the portable terminal 270.

The user monitoring part 239 monitors who is the user of each appliance 210 in the distributed coordination system 200 based on the user information stored in the user information storage part 238. In other words, the user monitoring part 239 functions as a first user identifying part for identifying a user who has executed a function module 120 in the present operating state information and the future operation schedule information, based on the user information stored in the user information storage part 238.

Further, even when an appliance 210 is operated not from a portable terminal 270 while for example there is an appliance that can take an image inside the house, the user monitoring part 239 may determine the user of the appliance 210 based on the taken image. If the user cannot be determined by using every means, the user monitoring part 239 determines that the user is unknown.

The future operation estimation part 235 receives inputs of the present operating state obtained by the present operating state obtaining part 132 and the future operation schedule obtained by the future operation schedule obtaining part 133, to estimate a future operation prediction. Further, in the embodiment 2, the future operation estimation part 235 estimates a future operation prediction for each user by using the information on the users identified by the user monitoring part 239. Thus, differently from the embodiment 1, information obtained as a future operation prediction includes an operator's name, function names, occurrence conditions of operations executed in the future respectively by function modules 120, cycle length (frequency), time, operation mode (function), and occurrence probabilities, as shown by such information, for example: "on weekdays", the probability of "mother's" operating "washing machine" "in one rinse mode" "at 7 a.m." "for 40 minutes" "everyday" is "90%".

Further, since it becomes possible to differentiate users, if information "son views TV", for example, is obtained as the present operating state, the future operation estimation part 235 can decrease the probability of executing the function modules 120 in a future operation prediction caused by "son". As a result, the future operation estimation part 235 can execute more accurate future operation estimation.

Further, owing to increase in the accuracy of the future operation estimation by the future operation estimation part 235, it is expected that the selection of a scenario and function modules 210 by the function module selection part 136 becomes more suitable for the distributed coordination system 200.

As described above, according to the embodiment 2, it is expected that the selection of a scenario becomes more suitable to the distributed coordination system 200 by determining a user of an appliance 210. Accordingly, it is possible to avoid more suitably a problem that a function of an appliance 210 cannot be executed or a problem that reconstruction of distribution becomes necessary for stopping execution of a function module 120 in the case where a user wants to execute the its own function of the appliance 210 in the future and the appliance 210 is at that time executing the function module 120 required for a service of the distributed coordination system 200.

Embodiment 3

As shown in FIG. 28, a distributed coordination system 300 according to an embodiment 3 includes a plurality of appliances 210, an appliance behavior monitoring device 330, and portable terminals 270.

The distributed coordination system 300 of the embodiment 3 is constructed similarly to the distributed coordination system 200 of the embodiment 2 except for the appliance behavior monitoring device 330.

In the embodiment 3, at least one of the plurality of appliances is installed inside the house as a predetermined range.

Figure 30:
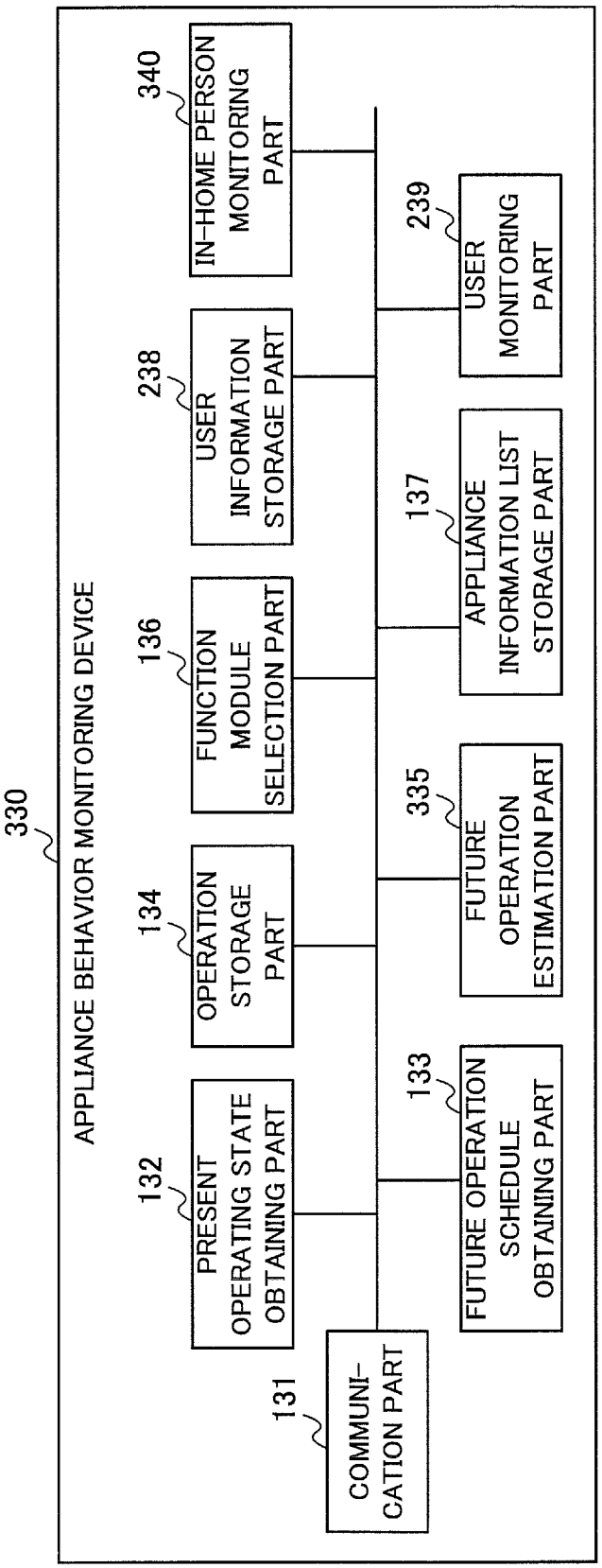
FIG. 30 is a schematic diagram showing a configuration of an appliance behavior monitoring device in an embodiment 3.

FIG. 30 is a schematic diagram showing a configuration of the appliance behavior monitoring device 330 in the embodiment 3.

The appliance behavior monitoring device 330 includes a communication part 131, a present operating state obtaining part 132, a future operation schedule obtaining part 133, an operation storage part 134, a future operation estimation part 335, a function module selection part 136, an appliance information list storage part 137, a user information storage part 238, a user monitoring part 239, and an in-home person monitoring part 340.

The appliance behavior monitoring device 330 in the embodiment 3 is constructed similarly to the appliance behavior monitoring device 230 in the embodiment 2 except for the future operation estimation part 335 and the in-home person monitoring part 340.

The in-home person monitoring part 340 estimates who are in the house where the distributed coordination system 300 is installed among the family members. In other words, the in-home person monitoring part 340 functions as a second user identifying part for identifying users who are inside the house. Determination of in-home persons is performed based on information on user identified for each appliance 210 by the user monitoring part 239 and in addition by providing some appliance 210 with a function module 120 for supervising persons who have passed through the entrance.

As the function module 120 for supervising persons who have passed through the entrance, it is possible to mention, for example, a module having a function of determining in-home persons by means of an image-taking device such as a monitoring camera placed at the entrance of the gate, or a module having a function of determining in-home persons by monitoring whether a portable terminal 270 held by an in-home person is located inside the house.

For example, when a portable terminal 270 is used to operate an appliance 210, if the portable terminal 270 is connected to a home network such as Wi-Fi (registered trademark), the in-home person monitoring part 340 can determine which person is inside the house based on the portable terminal identification information for identifying the portable terminal 270 and the user information stored in the user information storage part 238.

The future operation estimation part 335 receives inputs of the present operating state information obtained by the present operating state obtaining part 132 and the future operation schedule information obtained by the future operation schedule obtaining part 133, to estimate a future operation prediction. In the embodiment 3, the future operation estimation part 335 can estimate the future operation prediction by using the information on the in-home persons identified by the in-home person monitoring part 340 in addition to the information on the users identified by the user monitoring part 239. Accordingly, for the future operation prediction, the future operation estimation part 335 can largely reduce the possibilities of execution of the function modules 120 in an operation prediction caused by the users who are not inside the house. Further, the future operation estimation part 335 can perform monitoring of operations including one that is performed by a person right after his getting home at any time, and accordingly it is possible to predict future operation according to return of the persons registered in the distributed coordination system 300. As a result of these, the future operation estimation part 335 can perform highly-accurate prediction of future operation.

Owing to the increased accuracy of the future operation prediction, it is expected that the selection of scenario by the function module selection part 136 becomes more suitable selection for the distributed coordination system 300.

As described above, in the embodiment 3, by making a determination of in-home users of the appliances 210, it is expected that the selection of a scenario and appliances 210 becomes more suitable selection for the distributed coordination system 300. Accordingly, it is possible to avoid more suitably a problem that a function of an appliance 210 cannot be executed or a problem that reconstruction of distribution becomes necessary for stopping execution of a function module 120 in the case where a user wants to execute the its own function of the appliance 210 in the future and the appliance 210 is at that time executing the function module 120 required for a service of the distributed coordination system 300.

Embodiment 4

Figure 31:
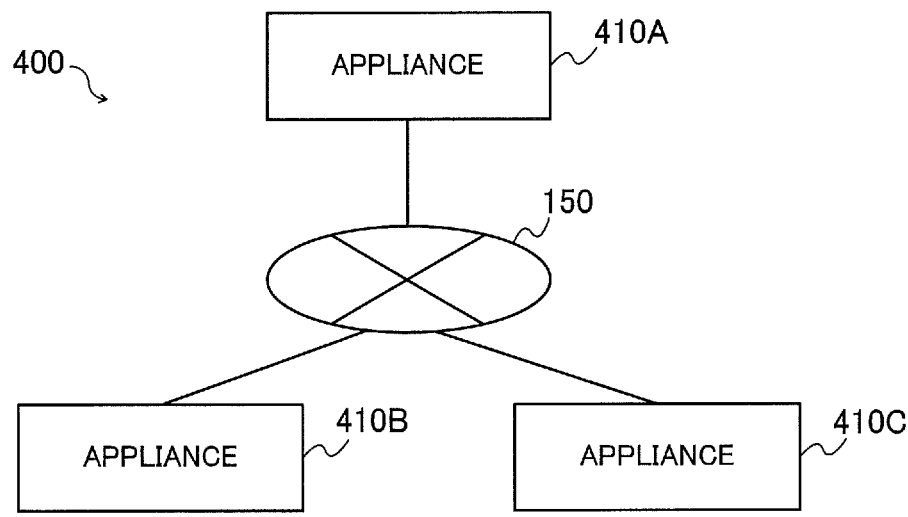
FIG. 31 is a schematic diagram showing a configuration of a distributed coordination system according to an embodiment 4.

FIG. 31 is a schematic diagram showing a configuration of a distributed coordination system 400 according to an embodiment 4.

The distributed coordination system 400 includes a plurality of appliances 410A, 410B, and 410C. Here, the distributed coordination system 400 does not include the appliance behavior monitoring device 130 of the embodiment 1.

The appliances 410A, 410B, and 410C are connected to the Internet 150.

Further, when it is not necessary to distinguish each of the appliances 410A, 410B, and 410C, it is referred to as an appliance 410.

Figure 32:
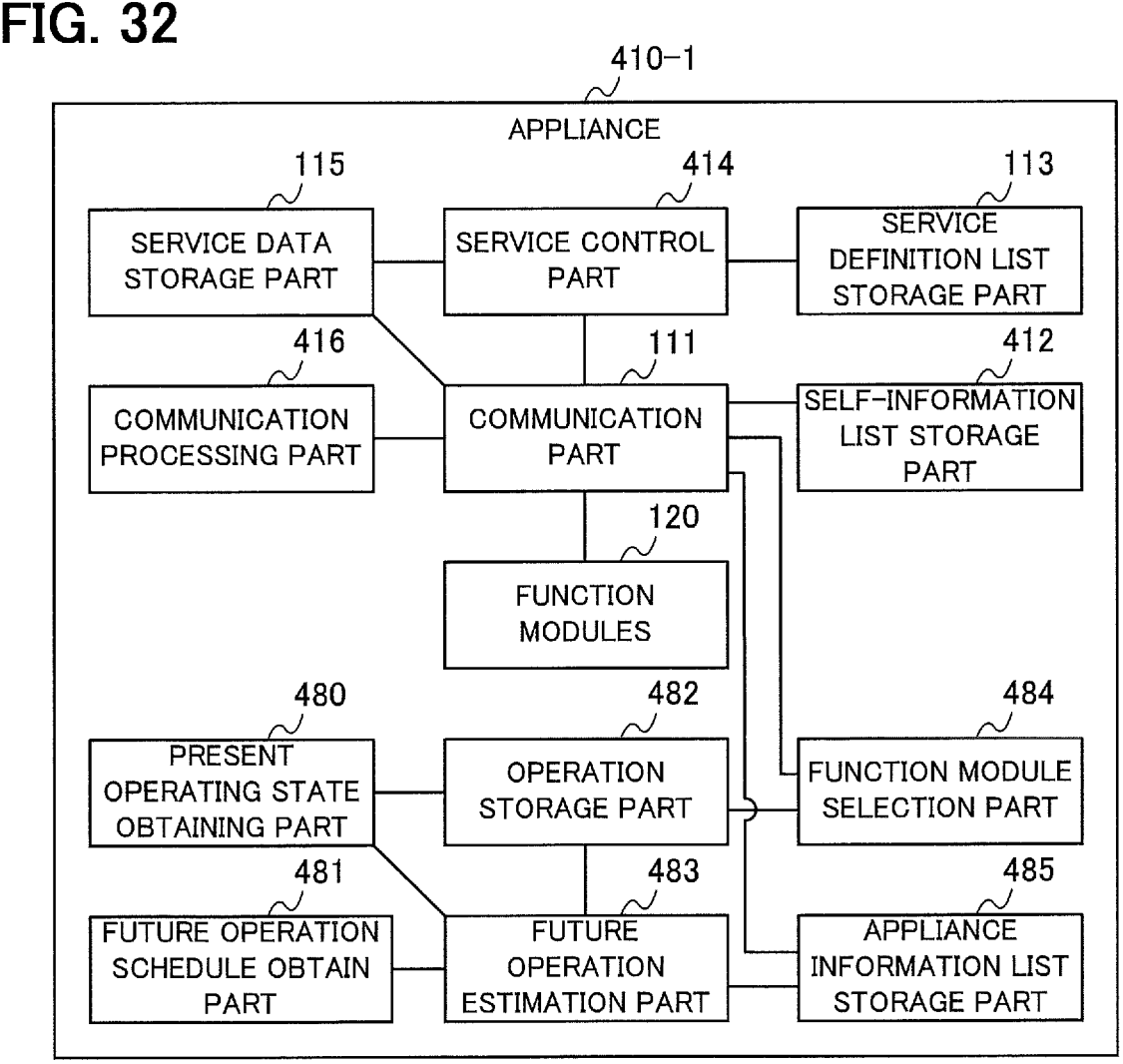
FIG. 32 is a block diagram showing schematically a first example of a configuration of an appliance in the embodiment 4.

FIG. 32 is a block diagram showing schematically a first example of a configuration of an appliance 410.

The appliance 410-1 shown in FIG. 32 includes a communication part 111, a self-information list storage part 412, a service definition list storage part 113, a service control part 414, a service data storage part 115, a communication processing part 416, function modules 120, a present operating state obtaining part 480, a future operation schedule obtaining part 481, an operation storage part 482, a future operation estimation part 483, a function module selection part 484, and an appliance information list storage part 485.

Figure 33:
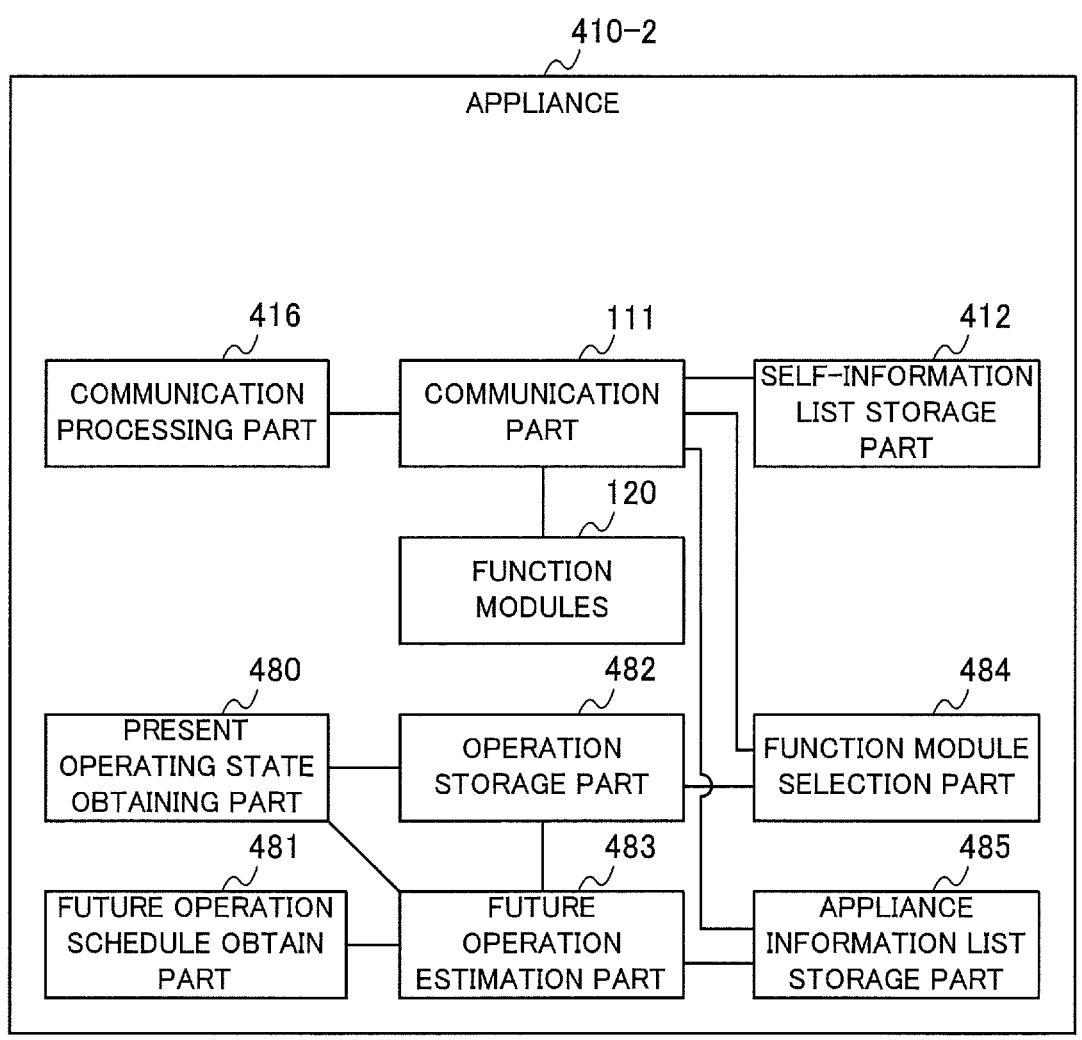
FIG. 33 is a block diagram showing schematically a second example of a configuration of an appliance in the embodiment 4.

FIG. 33 is a block diagram showing schematically a second example of a configuration of an appliance 410.

The appliance 410-2 shown in FIG. 33 includes a communication part 111, a self-information list storage part 412, a communication processing part 416, function modules 120, a present operating state obtaining part 480, a future operation schedule obtaining part 481, an operation storage part 482, a future operation estimation part 483, a function module selection part 484, an appliance information list storage part 485.

Among the parts shown in FIG. 33, parts similar to ones shown in FIG. 32 are given the same reference numbers.

Here, the communication parts 111, the service definition list storage part 113, the service data storage part 115, and the function modules 120 shown in FIG. 32 or FIG. 33 are similar to those in the embodiment 1.

The self-information list storage part 412 stores an appliance information list indicating operation costs required in activation of the function modules 120 of its own appliance 410 and required time which is time required for performing processing in the function modules 120 of its own appliance 410. The appliance information list may include information on the device performance such as the CPU, the memory, and the number of cores of its own appliance 410.

The communication processing part 416 sends the appliance information list stored in the self-information list storage part 412 to all the other appliances 410 via the communication part 111 when connection to the Internet 150 is started.

Further, the communication processing part 416 receives the appliance information list sent from another appliance 410 and stores the received appliance information list into the appliance information list storage part 485. Further, the communication processing part 416 reads out the appliance information list of its own appliance stored in the self-information list storage part 412, stores the appliance information list into the appliance information list storage part 485, and sends the appliance information list to the other appliances 410 via the communication part 111.

Further, when an obtaining request for the operation information is received from another appliance 410 via the communication part 111, the communication processing part 416 sends the operation information stored in the operation storage part 482 to the appliance 410 via the communication part 111 in response to the request.

The service control part 414 activates a service of its own appliance 410 when a user of the distributed coordination system 400 or an appliance 410 included in the distributed coordination system 400 calls for the service.

When the service is activated, the service control part 414 requests a function module selection part 484 to search for appliances 410 that have the function modules 120 required for the activated service, based on the service definition list stored in the service definition list storage part 113 of its own appliance 410. For example, the service control part 414 provides the service definition list of the activated service to the function module selection part 484, to obtain information indicating a scenario to be employed in the activated service and a plurality of appliances 410 for executing the function modules 120 in the scenario. Here, the function module selection part 484 to request may be the function module selection part 484 of its own appliance or of another appliance 410.

Then, according to the scenario indicated in the obtained information, the service control part 414 makes the plurality of appliances 410 indicated in the obtained information execute the function modules 120.

Further, the service control part 414 sends, as input data, the data stored in the service data storage part 115 via the communication part 111 to each of the function modules 120, and stores output data received by the communication part 111 from each of the function modules 120 into the service data storage part 115.

The present operating state obtaining part 480 collects a present operating state of its own appliance 410 at regular time intervals, and stores the collected information into the operation storage part 482.

The future operation schedule obtaining part 481 collects a future operation schedule of its own appliance 410 at regular time intervals, and stores the collected information into the operation storage part 482.

The operation storage part 482 stores, as operation information, its own appliance's present operating state obtained by the present operating information obtaining part 480, its own appliance's future operation schedule obtained by the future operation schedule obtaining part 481, and its own appliance's future operation prediction estimated by the future operation estimation part 483. Further, in response to a request from the future operation estimation part 483, the operation storage part 482 provides the present operating state information obtained by the present operating state obtaining part 480 and the future operation schedule information obtained by the future operation schedule obtaining part 481 to the future operation estimation part 483.

The future operation estimation part 483 receives inputs of the present operating state information obtained by the present operating state obtaining part 480 and the future operation schedule information obtained by the future operation schedule obtaining part 481, to estimate a future operation prediction of its own appliance. Although the estimation can cover any time length in the future direction, it is assumed that the estimation result is an estimation for at least one hour or more, preferably about 12 hours, from the time of estimation.

The function module selection part 484 obtains the service definition list that includes a list of function modules that its own appliance requires to execute services from the service control part 414 or the service control part 414 of another appliance 410. Then, based on the obtained service definition list and the appliance information list stored in the appliance information list storage part 485, the function module selection part 484 specifies a scenario to be employed and a plurality of appliances 410 to execute the function modules 120 in the employed scenario, and provides information indicating the specified scenario and the specified plurality of appliances 410 to the service control part 414.

The appliance information list storage part 485 stores the appliance information list sent from each appliance 410. Further, the appliance information list storage part 485 provides the stored appliance information lists to the function module selection part 484 at time when the function module selection part 484 requests them.

Next, operation of each appliance at time when a service of some appliance 410 is activated will be described.

First, a notification that a service of one appliance 410 is to be activated is sent to the service control part 414 of that one appliance 410, which is triggered by a user's operation or operation of a function module 120 of some appliance 410. Here, the appliance 410 whose service is activated is referred to as a first appliance 410. The appliance 410 that triggers the activation may be different from or the same as the first appliance 410.

Next, the service control part 414 of the first appliance 410 obtains the service definition list corresponding to the service to be activated from the service definition list storage part 113 of the first appliance 410.

Subsequently, the service control part 414 of the first appliance 410 provides the obtained service definition list to the function module selection part 484 of its own appliance.

Subsequently, the function module selection part 484 obtains the operation information of the appliances 410 having the function modules 120 described in the list of function modules included in the obtained service definition list from the operation storage part 482 of each appliance 410 via the communication part 111, and obtains the appliance information lists of the appliances 410 having the function modules 120 described in the list of function modules from the self-information list storage part 412 and the appliance information list storage part 485.

Subsequently, based on the obtained operation information and the obtained appliance information list, the function module selection part 484 specifies a scenario to be employed for executing the activated service and a plurality of appliances 410 to execute the function modules 120 in the employed scenario, and provides information indicating the specified scenario and the specified plurality of appliances 410 to the service control part 414.

Subsequently, according to the scenario specified by the function module selection part 484, the service control part 414 makes the plurality of appliances 410 specified by the function module selection part 484 execute the function modules 120.

According to the above operations, each function module 120 required for the service is executed, and as a result the service is executed.

In the embodiment 4, the functions of the appliance behavior monitoring device 130 in the embodiment 1 are added to each appliance 410. The embodiment 4, however, is not limited to this example. For example, the functions of the appliance behavior monitoring device 230 or 330 described in the embodiment 2 or 3 may be added to each appliance 410 of the embodiment 4.

As described above, according to the embodiment 4, the appliance behavior monitoring device 130 to 330 is incorporated in each appliance 410 differently from the distributed coordination systems 100 to 300 of the embodiments 1 to 3, it is possible to select function modules 120 of suitable appliances 410 under a condition that priorities are given to the its own operations of the appliances 410 without providing the appliance behavior monitoring device 130 to 330 and without hindering the its own functions of the appliances 410 at present and in the future. Accordingly, this has an effect that a service can be executed smoothly.

DESCRIPTION OF REFERENCE CHARACTERS 100, 200, 300, 400: distributed coordination system; 110, 210, 410: appliance; 111: communication part; 112, 412: self-information list storage part; 113: service definition list storage part; 114, 414: service control part; 115: service data storage part; 116, 216, 416: communication processing part; 120: function module; 130, 230, 330: appliance behavior monitoring device; 131: communication part; 132: present operating state obtaining part; 133: future operation schedule obtaining part; 134: operation storage part; 135, 235, 335: future operation estimation part; 136: function module selection part; 137: appliance information list storage part; 238: user information storage part 239: user monitoring part; 340: in-home person monitoring part; 270; portable terminal; 480: present operating state obtaining part; 481: future operation schedule obtaining part; 482: operation storage part; 483: future operation estimation part; 484: function module selection part; and 485: appliance information list storage part.

What is claimed is:

1. A distributed coordination system to provide a service, the distributed coordination system including a first appliance group of a plurality of appliances, the distributed coordination system comprising:
processing circuitry configured to
store an appliance information list indicating one or more function modules held by each appliance included in the first appliance group and required time for executing each function module of the one or more function modules;
store a service definition list indicating a plurality of scenarios each of which indicates a plurality of function modules to be executed for providing the service and an execution order of the function modules;
store present operating state information, future operation schedule information, and an operation history, the present operating state information indicating a function module currently under execution by each appliance included in the first appliance group among the one or more function modules, the future operation schedule information indicating a schedule of function modules to be executed in the future by each appliance included in the first appliance group among the one or more function modules, the operation history indicating a history of function modules executed in the past by each appliance included in the first appliance group among the one or more function modules;
generate, based on the operation history, operation prediction information indicating an occurrence probability of an operation to be executed in the future by each of the one or more function modules held by each appliance included in the first appliance group;
specify a plurality of appliances each of which has at least any one of the function modules among the first appliance group, based on the service definition list;
specify, for each of the specified appliances, an execution plan for executing from the present to the future the one or more function modules held by each of the specified appliances, based on the present operating state information, the future operation schedule information, and the operation prediction information;
specify a single scenario among the scenarios so as not to hinder the execution plan;
specify a second appliance group of a plurality of appliances out of the first appliance group so as not to hinder the execution plan, each of the appliances included in the second appliance group having at least any one of the function modules indicated in the single scenario; and
make, based on the single scenario, the second appliance group execute the function modules indicated in the single scenario, wherein
the appliance information list further indicates an operation cost, corresponding to a utilization rate of a CPU and/or a memory, of each appliance included in the first appliance group for a time period when each of the one or more function modules held by each appliance included in the first appliance group is executed; and
the processing circuitry specifies the single scenario and the second appliance group so that a sum of operation cost does not exceed a first threshold, the sum being calculated by adding, for the time period, the operation costs when each appliance included in the first appliance group executes the one or more function modules included in the execution plan and the operation costs during a time of execution of at least any one of the function modules.

2. A distributed coordination system of claim 1, wherein:
in the case where the sum exceeds the first threshold, the processing circuitry makes another appliance included in the first appliance group execute at least one of the function modules indicated in the single scenario so that the sum does not exceed the first threshold.

3. A distributed coordination system of claim 1, wherein:
in the case where the sum exceeds the first threshold, the processing circuitry makes another appliance included in the first appliance group execute a function module included in the execution plan among the one or more function modules so that the sum does not exceed the first threshold.

4. A distributed coordination system of claim 1, wherein:
in the case where the occurrence probability exceeds a second threshold, the processing circuitry makes the execution plan include a corresponding function module among the one or more function modules.

5. A distributed coordination system of claim 4, wherein:
the processing circuitry identifies a user who causes to be executed a function module currently under execution among the one or more function modules held by each appliance included in the first appliance group;
the operation history indicates at least one function module executed in the past by each appliance included in the first appliance group among the one or more function modules and the user who causes the at least one function module to be executed;
the processing circuitry specifies the occurrence probability of each of the one or more function modules for each user based on the operation history, and when the processing circuitry identifies the user who causes to be executed the function module currently under execution among the one or more function modules held by each appliance included in the first appliance group, reduces the occurrence probability of a function module corresponding to the identified user among the one or more function modules.

6. A distributed coordination system of claim 5, wherein:
the appliances are installed within a predetermined range;
the processing circuitry identifies users in the predetermined range; and
the processing circuitry reduces the occurrence probability of a function module corresponding to a user who is not identified by the processing circuitry among the one or more function modules.

7. An appliance behavior monitoring device in a distributed coordination system to provide a service, the distributed coordination system including a first appliance group of a plurality of appliances and the appliance behavior monitoring device, the appliance behavior monitoring device comprising:

processing circuitry configured to
    store an appliance information list indicating one or more function modules held by each appliance included in the first appliance group and on required time for executing each function module of the one or more function modules;
    store present operating state information, future operation schedule information, and an operation history, the present operating state information, the future operation schedule information, and an operation history being outputted from each appliance included in the first appliance group, the present operating state information indicating a function module currently under execution among the one or more function modules, the future operation schedule information indicating a schedule of function modules to be executed in the future among the one or more function modules, the operation history indicating a history of function modules executed in the past among the one or more function modules;
    generate, based on the operation history, operation prediction information indicating an occurrence probability of an operation to be executed in the future by each of the one or more function modules held by each appliance included in the first appliance group;
    obtain, from a single appliance included in the first appliance group, a service definition list indicating a plurality of scenarios each of which indicates a plurality of function modules executed for providing the service and an execution order of the function modules;
    specify, based on the service definition list, a plurality of appliances each of which has at least any one of the function modules among the first appliance group;
    specify, for each of the specified appliances, an execution plan for executing from the present to the future the one or more function modules held by each of the specified appliances, based on the present operating state information, the future operation schedule information, and the operation prediction information;
    specify a single scenario among the scenarios, so as not to hinder the execution plan;
    specify a second appliance group of a plurality of appliances each of which has at least any one of the function modules indicated in the single scenario out of the first appliance group, so as not to hinder the execution plan; and
make the single appliance control the second appliance group to execute the function modules indicated in the single scenario, wherein
the appliance information list further indicates an operation cost, corresponding to a utilization rate of a CPU and/or a memory, of each appliance included in the first appliance group for a time period when each of the one or more function modules held by each appliance included in the first appliance group is executed; and the processing circuitry specifies the single scenario and the second appliance group so that a sum of operation cost does not exceed a first threshold, the sum being calculated by adding, for the time period, the operation costs when each appliance included in the first appliance group executes the one or more function modules included in the execution plan and the operation costs during a time of execution of at least any one of the function modules.

8. An appliance having one or more function modules, the appliance being included in a plurality of appliances in a distributed coordination system to provide a service, the distributed coordination system including a first appliance group of the appliances and an appliance behavior monitoring device, the appliance comprising:
    processing circuitry configured to
        store a service definition list indicating a plurality of scenarios each of which indicates a plurality of function modules to be executed for providing the service and an execution order of the function modules; and
        output present operating state information, future operation schedule information, and an operation history to the appliance behavior monitoring device, the present operating state information indicating a function module currently under execution among the one or more function modules, the future operation schedule information indicating a schedule of function modules to be executed in the future among the one or more function modules, the operation history indicating a history of function modules executed in the past among the one or more function modules; wherein:
    the processing circuitry receives, from one of the first appliance group and the appliance behavior monitoring device, information indicating a single scenario specified from the scenarios and a second appliance group of a plurality of appliances each of which has at least any one of the function modules indicated in the single scenario among the first appliance group, the single scenario and the second appliance group having been generated such that a sum of operation cost, corresponding to a utilization rate of a CPU and/or a memory of each appliance included in the first appliance group a time period when each of the one or more function modules held by each appliance included in the first appliance group is executed, does not exceed a first threshold, the sum calculated by adding, for the time period, the operation costs when each appliance included in the first appliance group executes the one or more function modules included in the execution plan and the utilization rates during a time of execution of at least any one of the function modules; and
    the processing circuitry, based on the single scenario, makes the second appliance group execute the function modules indicated in the single scenario.

* * * * *